(12) United States Patent
Iwayama et al.

(10) Patent No.: US 7,139,827 B1
(45) Date of Patent: Nov. 21, 2006

(54) COMMUNICATION MEANS NOTIFICATION METHOD AND NOTIFICATION SYSTEM

(75) Inventors: Noboru Iwayama, Kawasaki (JP); Hiroyasu Sugano, Kawasaki (JP); Naohisa Kawaguchi, Kawasaki (JP); Koji Otani, Kawasaki (JP); Akinori Iwakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 799 days.

(21) Appl. No.: 09/656,418

(22) Filed: Sep. 6, 2000

(30) Foreign Application Priority Data

Oct. 20, 1999 (JP) .................................. 11-297829
Apr. 28, 2000 (JP) ............................. 2000-129702

(51) Int. Cl.
*G06F 15/16* (2006.01)

(52) U.S. Cl. ...................... 709/227; 709/228; 709/231; 709/204; 709/260

(58) Field of Classification Search ................ 709/227, 709/228, 204, 205; 370/260; 713/100
See application file for complete search history.

(56) References Cited

U.S. PATENT DOCUMENTS

| | | | | |
|---|---|---|---|---|
| 5,715,392 A | * | 2/1998 | Ansberry et al. ............ | 709/228 |
| 5,717,863 A | * | 2/1998 | Adamson et al. ........... | 709/204 |
| 5,854,898 A | * | 12/1998 | Riddle .......................... | 709/231 |
| 5,859,979 A | * | 1/1999 | Tung et al. .................. | 709/228 |
| 5,887,136 A | * | 3/1999 | Yasuda et al. ............... | 709/204 |
| 5,953,505 A | * | 9/1999 | Chida .......................... | 709/228 |
| 6,076,093 A | * | 6/2000 | Pickering .................. | 707/104.1 |
| 6,208,952 B1 | * | 3/2001 | Goertzel et al. ............ | 709/230 |
| 6,349,096 B1 | * | 2/2002 | Liu et al. ..................... | 370/352 |
| 6,370,381 B1 | * | 4/2002 | Minnick et al. ............ | 455/445 |
| 6,475,089 B1 | * | 11/2002 | Lee ............................. | 463/40 |
| 6,477,550 B1 | * | 11/2002 | Balasubramaniam et al. .......................... | 715/513 |
| 6,496,851 B1 | * | 12/2002 | Morris et al. ............... | 709/204 |
| 6,608,895 B1 | * | 8/2003 | Avidan .................. | 379/355.01 |
| 2001/0055963 A1 | * | 12/2001 | Cloutier ...................... | 455/417 |

FOREIGN PATENT DOCUMENTS

| | | |
|---|---|---|
| JP | 10-55492 | 2/1994 |
| JP | 7-250132 | 9/1995 |
| JP | 8-140158 | 5/1996 |

* cited by examiner

*Primary Examiner*—Jeffrey Pwu
(74) *Attorney, Agent, or Firm*—Staas & Halsey LLP

(57) ABSTRACT

Method and system for reporting to a source user before communication begins communication means usable by both the source and a destination user. Operable communication means at each user's information terminal are stored in a list DB 2 in advance for each user. A selection device 1 receives a destination user designation from the source user who is requesting communication, and acquires the usable communication means of the destination user and the source user respectively from the list DB 2. There are also cases in which the selection device 1 acquires communication means usable by the source user from the selection device 1 or a user terminal 4. Next, the selection device 1 creates a candidate list describing communication means which both parties can use, and sends it from a WWW server, for example, to the source user terminal. Before communication begins, the candidate list is displayed at the source user terminal by a WWW browser, for example.

8 Claims, 25 Drawing Sheets

| User ID | User Name | User Status | Communication Means | Useable | Attribute Information | Comm. Parameters |
|---|---|---|---|---|---|---|
| 0001 | Taro Suzuki | online | Email | Yes | for Office | **** |
| | | | Chat | Yes | at Office | ***** |
| | | | Instant message | Yes | at Office | ****** |
| | | | Telephone | Yes | for Office | *** |
| | | | Videoconference | No | at Office | ****** |
| 0002 | Hanako Yamada | busy | Email | Yes | | ***** |
| | | | Chat | No | | ****** |
| | | | Instant message | Yes | | *** |
| | | | Telephone | Yes | | |
| ... | ... | ... | ... | ... | | |

Fig. 4

| User ID | User Name | Communication Means | User Status | Priority |
|---|---|---|---|---|
| 0001 | Taro Suzuki | Mail | Online | 2 |
| | | | Other | 1 |
| | | Chat | Busy | 3 |
| | | | Other | 2 |
| | | Instant message | Online | 1 |
| | | | Other | 3 |
| | | Telephone | Away | 3 |
| | | | Office | 1 |
| | | | Other | 2 |
| | | Videoconference | All | 3 |
| 0002 | Hanako Yamada | Mail | Online | 1 |
| ⋮ | ⋮ | ⋮ | ⋮ | ⋮ |

Fig. 5

| User ID | User Name | User Status | Communication Means | Useable | Priority | Attribute Information |
|---|---|---|---|---|---|---|
| 0001 | Taro Suzuki | Online | Email | Yes | 2 | for Office |
| | | | Chat | Yes | 2 | at Office |
| | | | Instant message | Yes | 1 | at Office |
| | | | Telephone | Yes | 2 | for Office |
| | | | Videoconference | No | 3 | at Office |
| 0002 | Hanako Yamada | Busy | Email | Yes | 1 | |
| | | | Chat | No | 3 | |
| | | | Instant message | Yes | 2 | |
| | | | Telephone | Yes | 2 | |

| Communication means candidate list |
|---|
| Mail |
| Chat |
| IM |
| Phone |
| downloadable |

Select

| Videoconference Sharedblackboard Interactive game |
|---|

(b)

| Communication means candidate list |
|---|
| Mail |
| Chat |
| IM |
| Phone |
| Videoconference downloadable |
| Shared blackboard downloadable |

Fig. 17

Candidate DB

| User Name | Comm.Means Name | Can or Can't Use | Comm. Status | Update Time | Message |
|---|---|---|---|---|---|
| User A | IM @ Office | Can't | Standby | 14:43:50 | I'm here |
| | IM @ Lab | Can | Communicating | 15:23:30 | |
| | E-Mail | Can | Standby | 00:00:00 | |
| | NetMeeting @ Lab | Can | Standby | 08:50:00 | |
| | FileTransfer @ Office | Can't | Standby | 11:53:40 | |
| | Telephone @ Office | Can't | Standby | 14:33:10 | Busy |
| | Telephone @ Lab | Can | Requested | 10:13:20 | |
| | Voicemail | Can | Standby | 00:00:00 | |

Group DB

| User Name | Name | Link | Priority | Preference Information |
|---|---|---|---|---|
| User A | Messaging | IM @ Office | 1 | nkawa: IM @ Office or IM @ Office [sic] |
| | | IM @ Lab | 2 | kohda: Email |
| | | E-Mail | 3 | ohno: IM @ Office or IM @ Lab |
| | NetMeeting | NetMeeting @ Lab | 1 | |
| | NetMeeting | FileTransfer @ Office | | |
| | Telephone | Telephone @ Office | 1 | nkawa: Telephone @ Office or Telephone @ Office |
| | | Telephone @ Lab | 2 | kohda: Telephone @ Office or Telephone @ Office [sic] |
| | | Voicemail | 3 | ohno: Telephone @ Office or Telephone @ Office |

| Communication means | Message |
|---|---|
| IM @Lab | I'm here. |
| Telephone @ Lab | Busy |
| ⋮ | ⋮ |

*Fig. 22*

| Communication means | Communication contents | Start time | End time | Originator |
|---|---|---|---|---|
| IM @ Office | We decided the payment date will be 4/28. | 2000/04/22/15/58 | 2000/04/22/15/58 | User B |

*Fig. 23*

COMMUNICATION MEANS NOTIFICATION METHOD AND NOTIFICATION SYSTEM

BACKGROUND OF THE INVENTION

1. Technical Field

The present invention relates to communication systems wherein users communicate amongst themselves utilizing information terminals on a network carrying a plurality of communication means. More specifically, among such communication systems, it relates to a communication system wherein users can select communication means ahead of initiating communication.

2. Description of Related Art

In recent years, various types of communication means have been installed in information terminals on networks: telephone functions, email devices, instant messaging devices. Examples of this sort of information terminal include, for example, the PC (personal computer), WS (work station), portable telephones, and portable information terminals used in PHS (Japan's personal handy-phone system, comparable to PCS, personal communications service in the United States). When communication is called for, users make use of the various types of communication means to suit their situations, circumstances or preferences.

Given this situation, when requesting communication it is necessary to consider the status or circumstances of the party from which communication is requested, not just the party requesting communication. In Laid-Open Patent Application 1995-250132 and Laid-Open Patent Application 1996-140158 a user registers the communication means he himself uses in advance. When a user requests communication with another user, notification occurs as to whether or not it is possible to communicate with a communication means registered by the other user.

Also, Laid-Open Patent Application 1998-55492 provides technology whereby a communication means usage possibility indication is dynamically modified according to changes in the communication means that a party can use, and before communication begins the party is notified of usable communication means. In this invention each user registers usable communication means for specified statuses in advance. Communication means usable by the user who is designated the communication destination (simply "destination user" hereinafter) are reported to the party requesting communication in accordance with that user's status.

All of the foregoing art displays only the destination user's usable communication means. Therefore the user who is sending a communication request (simply "source user" hereinafter) to someone must search the other party's usable communication means for communication means which he himself can use. This puts a heavy burden on the user in matching the other party's circumstances when he wants to communicate, and is troublesome and inconvenient for the user. Also, the destination user's usable communication means are not necessarily those that the source user can simultaneously use.

On the other hand, when the destination user does not have the communication means that the source user wants to use, if the destination user does not download the communication means from a communication means provider, communication through that communication means cannot occur. Therefore the source user must use other communication means and ask the destination user to install the desired communication means and have the destination user report completion of the installation. Expanding communication means when one wants to start communicating places a great burden on the user and interferes with smooth communication.

In addition, in recent years there have been many cases in which one user uses a plurality of user terminals and uses a plurality of terminals to suit the user's status. For example, a portable terminal is used while on the go, and different computers are used at the office and home. Under these conditions, even if it is known that a communication means can or cannot be used at one terminal, if the same sort of information is not known for the communication means at another terminal it is difficult to perform communication that takes into account the other party's status.

SUMMARY OF THE INVENTION

An object of the present invention is to consider the situation at both the source user end and the destination user end and display communication means usable at both ends.

Another object of the present invention is to provide technology for performing communications wherein meanwhile the communication means are readily extended.

An additional object of the present invention is to present communication means responsive to an environment in which one user uses a plurality of terminals.

In order to resolve the foregoing issues, the invention in a first aspect provides a communication means reporting method used in a communication system that selectively uses communication means installed in information terminals in a network for users to communicate with each other; it comprises the steps of:

A. Associating operable communication means in each user's information terminal with users, and storing this information,
  B. Receiving a destination user designation from a source user requesting communication,
  C. Creating a list, based on the stored information, describing communication means that are operable at both the destination user's information terminal and the source user's information terminal, and
  D. Reporting the foregoing list to the source user before communication begins.

Usable communication means at each user's information terminal are associated with each user in advance, and that information is stored. When a source user specifies a destination user, a list of communication means which both parties can use is created based on the stored information. This list is sent to the source user's information terminal and displayed on a display, for example. The source user selects any of the communication means from the list, and communication with the specified destination user begins.

The invention in a second aspect provides a communication means notification system used in a communication system that selectively uses communication means installed in information terminals in a network for users to communicate with each other; it comprises a first table, administration means, designation means, acquisition means, creation means, and reporting means.

The first table associates communication means that are operable at each user's information terminal with users and stores that information. The administration means receives an operable communication means designation from a user and stores it in the foregoing first table. The designation means receives a destination user designation from the source user who is requesting communication. The acquisition means acquires communication means that are operable at both the source user's information terminal and the destination user's information terminal from the foregoing first table. The creation means creates, based on the acquired information, a list describing communication means usable by both the source user and the destination user. The reporting means reports the created list to the source user before communication begins.

Specifically, the source user specifies the destination user by some sort of means. Examples of specifying means include entering a telephone number, and selecting a user from a previously stored address book. The acquisition means acquires the communication means usable by both the source user and the destination user specified by the designation means respectively from the first table. The creation means creates a communication means list describing communication means that both the source user and destination user can use. The reporting means is structured using a WWW server and WWW browser, for example. The created communication means list is displayed in the WWW browser.

The invention in a third aspect provides a communication means notification system for the foregoing second aspect, additionally comprising a second table and priority means. The second table associates communication means usable in a specified user status with users and user status, and stores this information. The priority means receives settings for communication means usable in a specified user status and stores it in the second table.

In addition, in this system the foregoing first table stores user status in addition to communication means. The foregoing administration means receives the new user status setting and writes the communication means usable in the new user status to the first table in accordance with the settings of the second table.

The first table stores communication means usable by each user at that time. Therefore it can create a list of communication means that corresponds to dynamically changing user status.

The invention in a fourth aspect provides a communication means notification system for the foregoing second aspect, additionally comprising a second table and priority means. The second table associates communication means usable in a specified user status and the foregoing priority with users and user status, and stores this information. The priority means receives communication means usable in a specified user status and a priority setting for the foregoing communication means and stores these in the second table.

In addition, in this system the foregoing first table stores communication means priority and user status in addition to communication means. The foregoing administration means receives the new user status setting and writes the communication means usable in the new user status and the communication means priority to the first table in accordance with the settings of the second table. The foregoing acquisition means acquires the communication means usable by both the source user's information terminal and the destination user's information terminal and the communication means priority from the first table. The foregoing creation means creates the foregoing list based on the priority of communication means that both the source user and destination user can use.

The user sets priorities in advance for specified statuses for the communication means that he himself uses. If the user status changes, the priority of that user's communication means changes, so the administration means updates the first table. The list of communication means is created based on the priority of communication means usable by originating and destination user, so it is possible to create a communication means list corresponding to dynamically changing user status.

The invention in a fifth aspect provides a communication means notification system for the foregoing fourth aspect in which the foregoing creation means reorders communication means in accordance with the source user's priority.

Communication means usable by both the source user and the destination user may have different priorities. In this case, the communication means list is reported in the source user's priority ranking.

The invention in a sixth aspect provides a communication means notification system for the foregoing fourth aspect in which the foregoing creation means reorders communication means in accordance with the destination user's priority.

Communication means usable by both the source user and the destination user may have different priorities. In this case, the communication means list is reported in the destination user's priority ranking.

The invention in a seventh aspect provides a communication means notification system for the foregoing second aspect in which the foregoing designation means receives designations using identification information that specifies operable communication means at the destination user's information terminal.

For example, if the communication means is IRC (Internet Relay Chat), the identification information is a nickname. If the communication means is email, the identification information is an email address. If it's the telephone, it's a telephone number.

The invention in a eighth aspect provides a communication means notification system for the foregoing second aspect in which the foregoing designation means is able to receive a destination user designation using identification information that specifies operable communication means at the destination user's information terminal, and if both the destination user and the source user can use communication means corresponding to the foregoing identification information, the foregoing creation means describes the relevant communication means at the start of the list.

For example, the source user specifies the destination user by entering a telephone number. If both users can use the telephone, the creation means creates a list starting with the telephone, even if there are other usable communication means.

The invention in a ninth aspect provides a communication means notification system for the foregoing second aspect in which the foregoing designation means is able to receive a destination user designation using identification information that specifies operable communication means at the destination user's information terminal, and if both the destination user and the source user can use communication means corresponding to the foregoing identification information, the system additionally comprises a starting means for starting communication using the relevant communication means.

For example, the source user specifies the destination user by entering a telephone number. If both users can use the telephone, the starting means starts setting up a communication line using the telephone, even if there are other usable communication means.

The invention in a tenth aspect provides a communication means notification system for the foregoing second aspect in which the foregoing communication means is a game application in which a plurality of users can participate on a network.

Examples of game applications for a plurality of users to participate interactively on a network include, for example, mahjong games, interactive sports games, and the like.

The invention in an eleventh aspect provides a computer-readable recording medium recording a communication means reporting program used in an information terminal with a communication means installed for users to selectively communicate with one another or used in an information terminal that can communicate with the foregoing information terminal; the foregoing communication means reporting program executes the following stages:

A. Preparing a first table that associates operable communication means in each user's information terminal with users, and stores this information, B. Receiving an operable communication means setting from a user and storing it in the foregoing first table, C. Receiving a destination user designation from a source user requesting communication, D. Acquiring communication means that are operable at both the source user's information terminal and the destination user's information terminal from the foregoing first table, E. Creating a list, based on the acquired information, describing communication means usable by both the source user and the destination user, and F. Reporting the created list to the source user before communication begins.

This has the same sort of operating effect as the foregoing second aspect.

The invention in a twelfth aspect provides a communication means reporting method used in a communication system that selectively uses communication means installed in information terminals in a network for users to communicate with each other; it comprises the steps of:

A. Associating operable communication means in each user's information terminal with users, and storing this information, B. Receiving a destination user designation from a source user requesting communication, C. Creating a first list, based on the stored information, describing communication means that are operable at both the destination user's information terminal and the source user's information terminal, D. Creating a second list describing communication means which are present at either the destination or source user's information terminal and not at the other, and which can be downloaded to the terminal that does not have the relevant communication means and can be executed at the terminal, and E. Reporting a third list that combines the first list and the second list to the source user before communication begins.

The first list describes communication means that both the originating and destination user have. The second list describes communication means that one has and the other doesn't. However, the communication means described in the second list are communication means that can be downloaded to the user terminal that does not have that communication means and can be executed at that terminal.

The invention in a thirteenth aspect provides a communication means notification system for the foregoing twelfth aspect in which the foregoing second list includes a description of communication means which neither the destination nor source user's information terminal has, and which can be downloaded to both terminals and can be executed at both terminals.

For example, neither the destination nor source user has videoconference means. However, if videoconference means can be downloaded to both terminals and can be executed at both terminals, videoconference means is also described in the second list.

The invention in a fourteenth aspect provides a communication means notification system for the foregoing twelfth aspect in which the foregoing download conditions for downloading communication means to a user's information terminal and execution conditions for executing communication means at a user's information terminal are stored in advance for each downloadable communication means, and the second list is created based on a user's information terminal's terminal information and download conditions and execution conditions.

Download conditions and execution conditions for downloadable communication applications are stored in advance in a database or the like. These include, for example, empty hard disk space required for downloading, memory needed for executing the application and the like. The communication means that can be executed at the user terminal are determined from among the downloadable communication applications based on terminal information such as idle memory at the user's terminal and communication application download conditions and execution conditions.

The invention in a fifteenth aspect provides a communication means notification system for the foregoing twelfth aspect in which selection of any of the communication means on the third list is received from the source user and the selected communication means is reported to the destination user's information terminal, and if the destination user's information terminal does not have the selected communication means, the destination user's information terminal acquires the selected communication means by downloading.

More specifically, a communication application is downloaded to the destination user's terminal according to the source user's selection. The user's consent may be obtained before executing the download.

The invention in a sixteenth aspect provides a computer-readable recording medium recording a program for executing the communication means reporting methods set forth in the foregoing twelfth through fifteenth aspects. It achieves the same sort of operating effect as the foregoing twelfth through fifteenth aspects.

The invention in a seventeenth aspect provides a communication means notification system used in a communication system that selectively uses communication means installed in information terminals in a network for users to communicate with each other; it comprises a first table, a designation means, a first creation means, a second creation means, and a reporting means.

The first table associates operable communication means in each user's information terminal with users, and stores this information. The designation means receives a destination user designation from a source user requesting communication. The first creation means creates a first list, based on the stored information, describing communication means that are operable at both the destination user's information terminal and the source user's information terminal. The second creation means creates a second list describing communication means which are present at either the destination or source user's information terminal and not at the other, and which can be downloaded to the terminal that does not have the relevant communication means and can be executed at the terminal. The reporting means reports a third list that combines the first list and the second list to the source user before communication begins.

This achieves the same sort of operating effect as the foregoing twelfth aspect.

The invention in an eighteenth aspect provides a communication means supply device used in the communication means notification system of the foregoing seventeenth aspect. This device comprises a creation means and a supply means. The creation means creates a list of communication means that can be downloaded to an information terminal and can be executed at the information terminal for destination users and source users respectively. The supply means supplies communication means included in the foregoing list to user information terminals.

The second list of the foregoing twelfth aspect is created based on the list created by this device. Also, in the twelfth aspect the communication means which the source user selects from the third list is supplied to the source user by this device.

The invention in a nineteenth aspect provides a communication means reporting method used in a communication system that selectively uses communication means installed in information terminals in a network for users to communicate with each other; it comprises the steps of:

A. Associating operable communication means in each user's single information terminal or plurality of information terminals and terminal identification information identifying the user's information terminals with users, and storing this information, B. Receiving a destination user designation from a source user requesting communication, C. Creating a list, based on the stored information, describing communication means that are operable at both the destination user's information terminal and the source user's information terminal, and D. If a plurality of the same communication means is included in the foregoing list, adding information for identifying the information terminals to the foregoing list and reporting the foregoing list to the source user before communication begins.

For example, if the list includes telephone at the office and telephone at the lab, the list should display "telephone @ office" and "telephone @ lab" respectively in order to distinguish them.

The invention in a twentieth aspect provides a communication means reporting method for the foregoing nineteenth aspect in which a user-set message corresponding to a communication means in an information terminal is stored together with a communication means and information terminal, and a message set by the destination user is additionally included in the list reported to the source user.

Examples of messages include "I'm here" and "Busy." By reporting the communication means along with a message the destination user can easily indicate his own status or desire, and this encourages smooth communication.

The invention in a twenty-first aspect provides a communication means reporting method for the foregoing nineteenth aspect in which the foregoing communication means operable at the same user's single information terminal or plurality of information terminals are grouped by predetermined criteria, and the foregoing list is created based on the grouped communication means, and the communication means described in the foregoing list are grouped using the foregoing predetermined criteria and reported to the source user before communication begins.

For example, communication means are grouped for each category of communication means. In this case, the communication means list reported to the source user is also grouped for each category of communication means. Categories of communication means include telephone, messaging, file transfer, and the like.

The invention in a twenty-second aspect provides a communication means reporting method for the foregoing twenty-first aspect in which a priority ranking is set for each group in the foregoing communication means, and the foregoing list is created based on the priority ranking. For example, the list describes only each group's highest priority communication means.

The invention in a twenty-third aspect provides a communication means reporting method for the foregoing twenty-second aspect in which the foregoing priority ranking is set based on the sequence in which communication means became usable inside a group.

For example, the priority ranking of the communication means most recently used within a group is "1."

The invention in a twenty-fourth aspect provides a communication means reporting method for the foregoing twenty-second aspect in which a recommended communication means is set for each source user in each group of the foregoing communication means, and the priority ranking of communication means for each source user is modified and the foregoing list is created. The priority ranking of communication means desired is modified for each source user.

The invention in a twenty-fifth aspect provides a communication means reporting method for the foregoing twenty-first aspect in which selection of any group based on the foregoing list is received from the source user, and an attempt is made to communicate with the destination user's communication means included in the selected group.

For example, if telephone is selected, all of the destination user's telephones are called, and communication begins with the telephone that answers.

The invention in a twenty-sixth aspect provides a communication means reporting method for the foregoing twenty-first aspect in which selection of any group based on the foregoing list is received from the source user, an inquiry is made to the destination user's communication means included in the selected group as to whether it's receiving or not, and communication begins with the communication means in the destination user's information terminal that is first to respond.

For example, if telephone is selected, a reception confirmation is sent to all of the destination user's telephone terminals, and communication begins by telephone with the first terminal to respond.

The invention in a twenty-seventh aspect provides a computer-readable recording medium recording a program for executing the communication means reporting methods of any of the foregoing nineteenth through twenty-sixth aspects. This recording medium achieves the same sort of operating effect as the foregoing nineteenth through twenty-sixth aspects.

The invention in a twenty-eighth aspect provides a communication means notification system used in a communication system that selectively uses communication means installed in information terminals in a network for users to communicate with each other; it comprises a first table, a designation means, a creation means, and a reporting means.

The first table associates operable communication means in each user's single information terminal or plurality of information terminals and terminal identification information identifying the user's information terminals with users, and stores this information. The designation means receives a destination user designation from a source user requesting communication. The creation means creates a list, based on the stored information, describing communication means that are operable at both the destination user's information terminal and the source user's information terminal. If a plurality of the same communication means is included in the foregoing list, the reporting means adds information for identifying the information terminals to the foregoing list and reports the foregoing list to the source user before communication begins.

This achieves the same sort of operating effect as the foregoing nineteenth aspect.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 4 is a conceptual diagram explaining user table in user DB 13;

FIG. 5 is a conceptual diagram explaining preference table in user DB 13;

FIG. 6 is a conceptual diagram explaining information in list DB 2;

FIG. 17 is an example of a candidate list display in the third embodiment;

FIG. 20 is a conceptual diagram illustrating data stored in candidate DB;

FIG. 21 is a conceptual diagram illustrating data stored in group DB;

FIG. 22 is a conceptual diagram illustrating a message list;

FIG. 23 is a conceptual diagram illustrating data stored in contents DB;

DETAILED DESCRIPTION OF THE PREFERRED EMBODIMENTS

Next, a communication means notification system in accordance with the present invention shall be described in detail while presenting embodiments.

First Embodiment

Configuration

Figure 1:
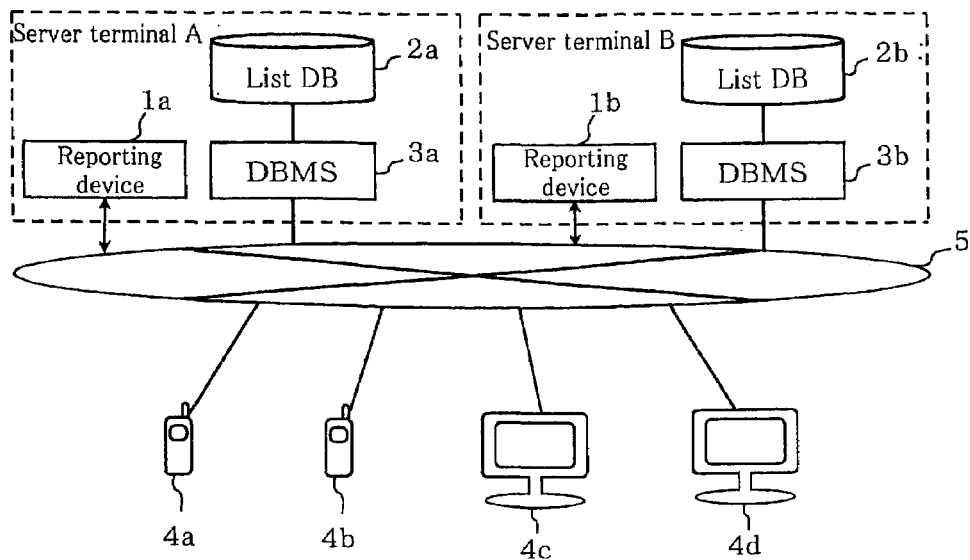
FIG. 1 is an overall structural view of notification system in accordance with first embodiment.

FIG. 1 is a drawing showing the overall structure of a notification system in accordance with the first embodiment. In this notification system, a notification device 1, list DB 2, DBMS (Data Base Management System) 3, and user terminals 4a, b, c, and d are connected via a network 5.

The notification device 1 is both: (1) provided in a user terminal; and (2) provided in a server terminal. This embodiment is an example in which the foregoing (1) and (2) notification devices 1 are intermixed. In FIG. 1 user terminals 4a and b do not have notification device 1 installed, and user terminals 4c and d have notification device 1 installed. User terminals 4a and b are portable phones or PHS, for example. User terminals 4c and d are a PC or WS, for example.

Also, in the case of the notification device 1 for the latter instance (2), one notification device 1 can provide centralized administration for many server terminals, or a plurality of notification devices 1 provided in a plurality of server terminals a and b respectively can provide diversified administration. FIG. 1 shows the latter structure with diversified administration.

The DBMS 3 and the list DB 2 may be connectable with the notification device 1 on the network. For example, the DBMS 3 and the list DB 2 may be in an information terminal operated by the notification device 1, or in another information terminal. The DBMS 3 and the list DB 2 are usually provided in a one-to-one relationship with a plurality of notification devices 1, but a plurality may also be provided.

In FIG. 1 the notification devices 1a and 1b are provided in a one-to-one relationship with the lists DB 2a and 2b and the DBMS 3a and 3b respectively. The list DB 2a and 2b store specific information related to user terminals under the administration of the notification devices 1a and 1b respectively. In other words, specific information pertaining to the user terminals 4a, b, c, and d is dispersed and stored in the list DB 2a and 2b.

Network 5 can be the Internet or an Intranet, a mobile communications network or the like.

(1) Notification Device

Figure 2:
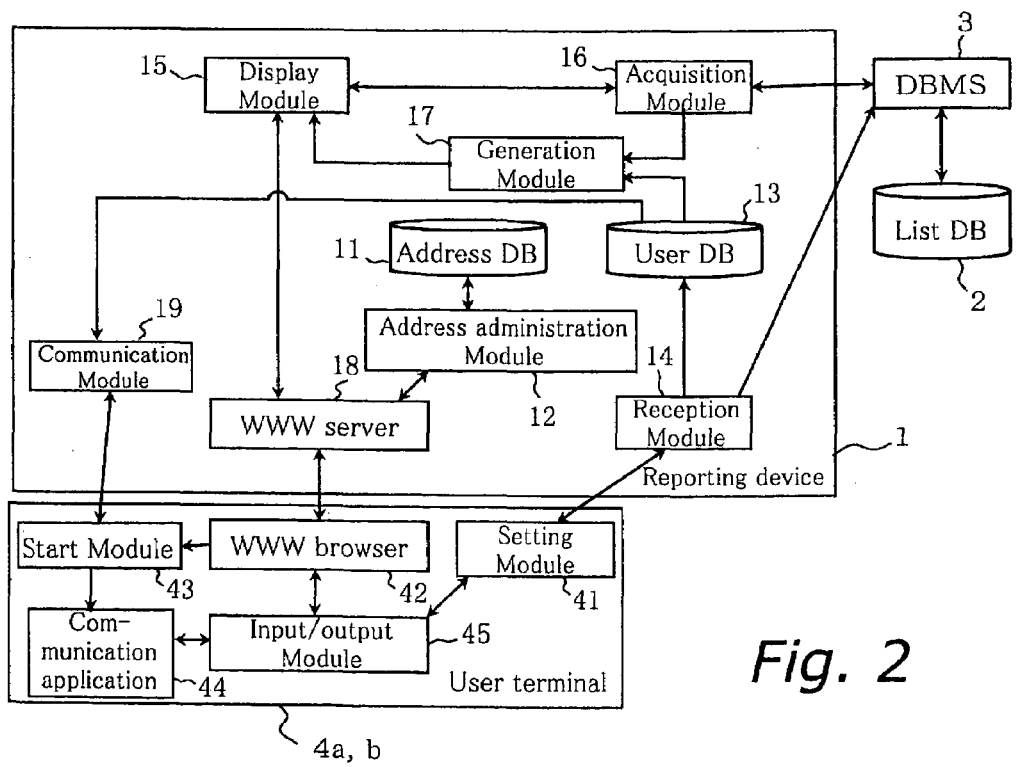
FIG. 2 is a block diagram showing functional structure of notification device.
Figure 3:
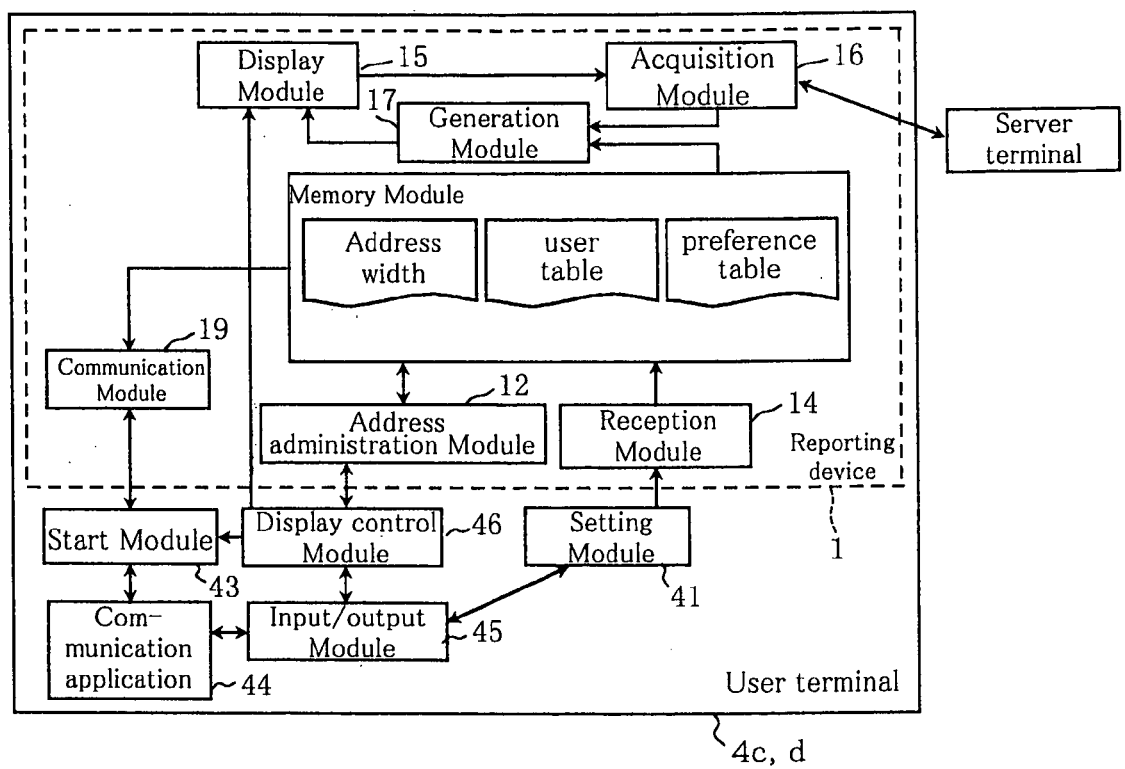
FIG. 3 is a block diagram showing functional structure of user terminal with notification device.

FIG. 2 is a block diagram showing the functional structure of the notification device 1 and a user terminal that does not have a notification device 1. FIG. 3 is a block diagram showing the functional structure of a user terminal that has a notification device 1. The notification device and user terminal have the same functions in both FIG. 2 and FIG. 3, so the structure of the notification device 1 shall be explained using FIG. 2.

The notification device 1 in FIG. 2 has an address DB 11, address administration module 12, user DB 13, receiving module 14, display module 15, acquisition module 16, creation module 17, WWW server 18, and communications module 19. Furthermore, the address administration module 12, receiving module 14, display module 15, acquisition module 16, and creation module 17 are external programs of the WWW server 18, and are linked to the WWW server 18 and operated via a CGI (Common Gateway Interface) or in a library format. Other interface programs may be used instead of CGI for the interface program between these external programs and the WWW server 18.

An address book is stored in the address DB 11. The address book (not shown in drawing) associates and stores the names and user IDs of each user's friends and acquaintances. A user ID is authorization information for universally specifying a user in the notification system.

The address administration module 12 writes to and reads from the address book according to instructions from a user terminal. Contents read by the address administration module 12 are sent to the WWW server 18 and displayed at the user terminal using a WWW browser 42 to be described later. The address DB 11 and the address administration module 12 are not always required, but if provided they are convenient when the user specifies the destination user.

The user DB 13 stores specific information pertaining to users. FIG. 4 is a diagram giving a conceptual explanation of a user table stored in the user DB 13. The user table stores user ID, user name, user status, communication means, whether or not the communication means is usable, attribute information, and communication conditions. This information is user information corresponding to user terminals 4a and b, which do not have a notification device 1.

"User ID," like the user ID in the address book, is identification information for universally specifying a user in this system.

"User name" describes the name of the user corresponding to user terminals 4a and b, which do not have a notification device 1.

"User status" describes the latest user status of each user. User status is selectively set from predetermined statuses. Examples of specified statuses are "online," "busy," "away," and "offline." User status can be entered by the user or automatically detected by any of other means and set. For example, FIG. 4 shows that the status of user "Taro Suzuki" is "online," and the status of "Hanako Yamada" is "busy."

"Communication means" describes the operable communication means at each user's terminal. For example, FIG. 4 shows that communication using email, chat, instant message, telephone, and videoconference is possible at the terminal of user "Taro Suzuki." Furthermore, chat is a communication means in which a plurality of users share the same virtual channel, and can send and receive text messages in real time. Instant message is a communication means in which user terminals can send and receive text messages in real time on a one-to-one basis.

Communication means are not particularly limited; in addition to the foregoing they may include any communication means that can be installed in an information terminal, such as FTP (File Transport Protocol) devices, game applications, and the like. It is also possible to list communication means that cannot be used on the terminal at that point in time, or applications that are usable through downloading from the network. In the following explanation, this sort of application is simply referred to as a downloadable application.

"Usable?" describes whether or not a communication means in a user's terminal is usable or not, in accordance with user status; it may be described as either usable or not. For example, FIG. 4 shows that user "Taro Suzuki" can communicate using email, chat, instant message, and telephone, and cannot communicate using videoconference.

"Attribute information" can store optional information pertaining to the communication means. For example, in FIG. 4 it stores text data showing where the communication means is used. Also, a user can list a text message that he wants to report to his selected destination as attribute information.

"Communication conditions" store the communication conditions necessary for beginning communication when actually using the communication means operating at the user terminal. Examples of communication conditions include communication address, transmission rate, and the like.

In addition to the foregoing information, it is possible to store other information in the user table as required, of course. For example, a terminal name for identifying the user terminal can be stored.

FIG. 5 is a diagram giving a conceptual explanation of a preference table stored in the user DB 13. The preference table associates and stores user ID, user name, communication means, user status, and priority.

"User ID," "user name," and "communication means" describe the same contents as the contents of the user table shown in the foregoing FIG. 4.

"User status" and "priority" store the specified user status and the priority of the communication means in that status in accordance with user settings. For example, in FIG. 5 "Taro Suzuki" has set priority "2" in the status "online" for the communication means "email," and has set priority "1" for other statuses. Also, he has set priority "1" in the status "online" for "instant message." FIG. 5 shows that the priority of communication means for "Taro Suzuki" in "online" status is as follows.

Priority 1: Instant messaging
Priority 2: Email, chat, telephone
Priority 3: Videoconferencing Furthermore, in this embodiment any of "1," "2," or "3" can be set as priorities.

The receiving module 14 receives settings for the user table or preference table from the user terminal, and stores them in each table in the user DB 13. If a user status is stored in the user table, the receiving module 14 decides whether or not a communication means corresponding to the user status can be used, and updates "usable?" Also, when a user status or communication means recorded in the user table changes, the receiving module 14 updates the list DB 2 (to be described later) in accordance with the preference table. As described later, this is because the list DB 2 stores whether or not a communication means can be used at each user's terminal and its priority in accordance with the latest user status.

The display module 15 receives a user ID specified as a destination from the user terminal via the WWW server 18, and reports it to the acquisition module 16. The display module 15 also sends the user terminal a communication means candidate list created by the creation module 17 via the WWW server 18. As described later, this communication means candidate list lists communication means that both the source user and destination user can use.

The acquisition module 16 receives the destination user's user ID from the display module 15, and if it is a user ID within the local server terminal, reports it to the DBMS 3; if the ID is not in the local server terminal, acquisition module 16 reports this to the server terminal having jurisdiction. Also, the acquisition module 16 receives a candidate list of communication means usable by the destination user (hereinafter "destination candidate list") from the DBMS 3 in the local server terminal or in the server terminal that is administering the destination user's information, and sends it to the creation module 17.

The creation module 17 determines the communication means that the source user can use, based on the user-table and preference table, and creates a communication source candidate table in which these communication means are listed. Next, the creation module 17 creates a candidate list listing the communication means that the source user and destination user can use, based on the communication destination and communication source candidate lists. The creation module 17 can also rearrange the communication means on the candidate list based on communication source and communication destination priority.

The WWW server 18 receives the communication means candidate list from the display module 15, and sends it to the WWW browser 42 at the source user's terminal. The WWW server 18 also receives the address book from the address administration module 12, and sends it to the WWW browser 42 at the user terminal. It should be understood that instead of the WWW server 18 it is also possible to provide an application for a specialized notification device that has the same function, and supply the candidate list or address book to the user terminal.

The communications module 19 receives from the source user terminal the results of selecting communication means from the candidate list. The communications module 19 reads the selected communication means' communication conditions from the user table for the source user. Next, the communications module 19 reports the necessary settings to the notification device 1 administering the source user's terminal. Necessary settings include transmission rate adjustments, acquisition of participation channel names, and acquisition of intercommunication addresses. In addition, the communications module 19 reports the necessary settings to the user terminal. Subsequently, the user terminal activates the communication means using the set communication conditions and communication begins.

(2) List DB and DBMS

FIG. 6 is a diagram giving a conceptual explanation of the information stored in the list DB 2. The list DB 2 associates and stores user ID, user name, status, communication means, usable?, priority, and attribute information. "User ID," "user name," "user status," "communication means," "usable?," and "attribute information" match the same information in the user table in the user DB 13.

"Priority" describes priority in accordance with user status, based on each user's preference table. For example, FIG. 6 is set to show an example in which the status of user "Taro Suzuki" is "online"; the priority of each communication means is displayed based on the contents of the preference table.

Furthermore, in addition to the previously described information, other information as required can be stored in the list DB 2, of course.

The DBMS 3 reads and writes the list DB 2. Specifically, when the DBMS 3 receives a new user status or new communication means setting from the foregoing receiving module 14 in the notification device 1, it updates the list DB 2 based on that information. Also, when a user ID is received from the acquisition module 16, the DBMS 3 searches the list DB 2 using the user ID as a key, and sends the acquisition module 16 usable communication means and their status for the relevant user. Of course, DBMS 3 can also search the list DB 2 using information other than user ID, such as user name, as the key.

(3) User Terminal

The user terminals 4a and 4b have a settings module 41, WWW browser 42, input/output module 45, startup module 43, and communication application 44.

The settings module 41 receives input of specified user information, and sends it to the notification device 1. User information is information set in the user table or preference table. The settings module 41 can also automatically detect user status from among user information by a predetermined method. Also, the settings module 41 displays a previously prepared window in input/output module 45, and receives input of the foregoing user information. This window shall be described later.

The WWW browser 42 sends address book display requests to the notification device 1, and outputs the address book sent in response to the foregoing request to the input/output module 45. The WWW browser 42 also receives the candidate list from the notification device 1, and displays it in the input/output module 45. Furthermore, a display application specialized for a notification device can be installed at the user terminal instead of the WWW browser 42.

The startup module 43 reports the communication means selected from the candidate list displayed at input/output module 45 to the notification device 1. The startup module 43 also receives communication conditions from the notification device 1. Next, the startup module 43 transfers the communication conditions to the communication application 44 corresponding to the selected communication means, and starts the communication application 44. Examples of the communication application 44 include email devices, chat clients, instant messaging devices, and FTP devices. Starting the communication application 44 begins communication between the destination user and the source user.

(4) Notification Device in User Terminal

FIG. 3 is a block diagram showing the functional structure of the notification device 1 and user terminals 4c and d when the notification device 1 is provided in the user terminal. With the exception of providing a display control module 46 instead of the WWW server 18 and the WWW browser 42, the configuration is likewise as with the notification device 1 and user terminal in FIG. 2.

The display control module 46 has functions combining the WWW server 18 and the WWW browser 42. That is, the display control module 46 outputs the address book sent from the address administration module 12 and the candidate list sent from the display module 15 to the input/output module 45.

Furthermore, if the notification device 1 is provided in the user terminal, only information relating to the user using the user terminal is stored in the address book, user table, and preference table.

Screen Examples (1) Candidate List Display Example

FIGS. 7–11 are examples of displaying candidate lists of communication means displayed at the user terminal in this embodiment of a notification system.

Figure 7:
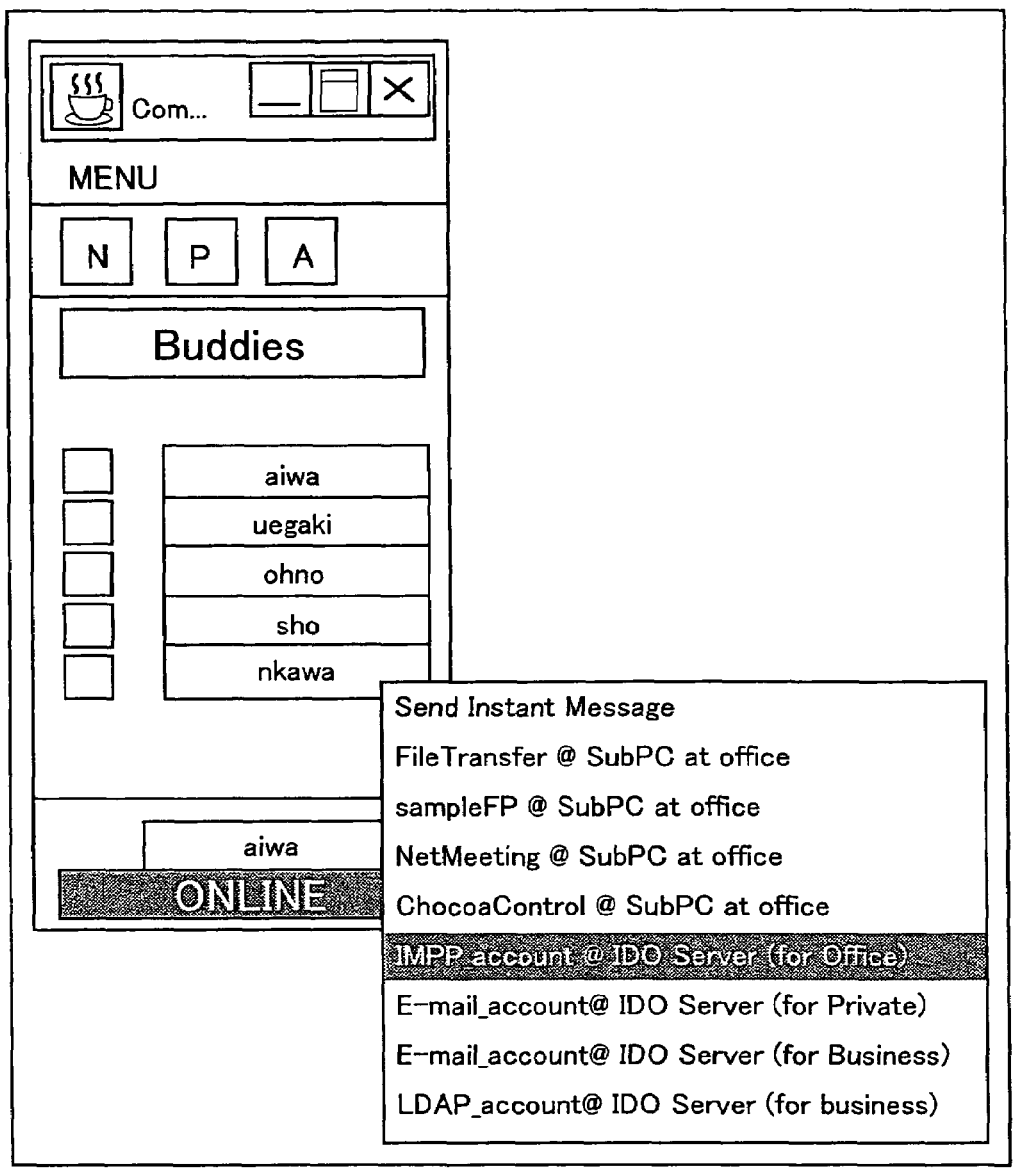
FIG. 7 is an example of a candidate list display (1)

FIG. 7 is an example of a candidate list displayed when the source and destination user's user terminals are connected to a network, i.e., are online. In the picture, the information terminal name "SubPC" is displayed after the @ mark in the list of communication means.

In addition, the information attribute "(for Office)" is displayed after the information terminal name. Downloadable communication means are displayed in italics. The display method that is "downloadable" is displayed only when downloadable functions are present, and when this function is selected a list of downloadable applications is displayed. Also, as shown in FIGS. 7, 8, 10, and 11, the list of downloadable applications may be displayed with the usable communication means.

Figure 8:
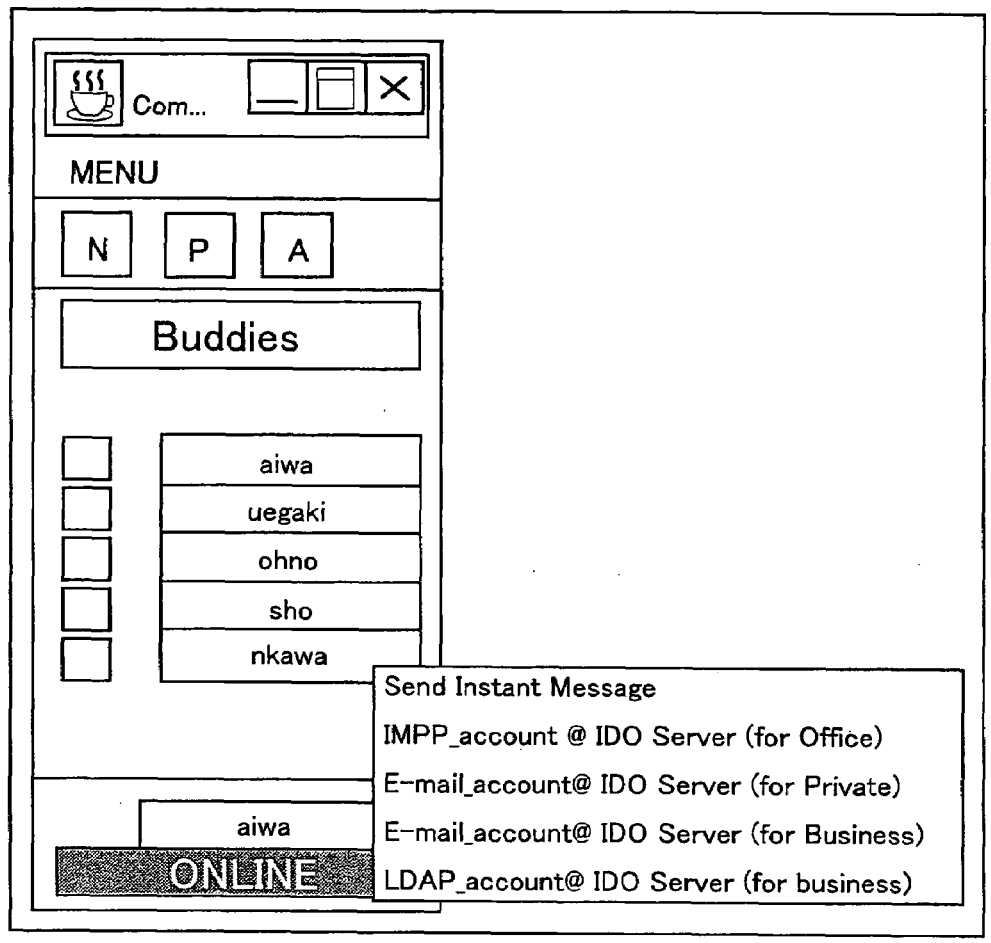
FIG. 8 is an example of a candidate list display (2)

FIG. 8 is an example of the candidate list displayed when the source user is online and the destination user terminal is disconnected from the network, i.e., is offline. The displayed communication means are only the communication services provided by the server.

Figure 9:
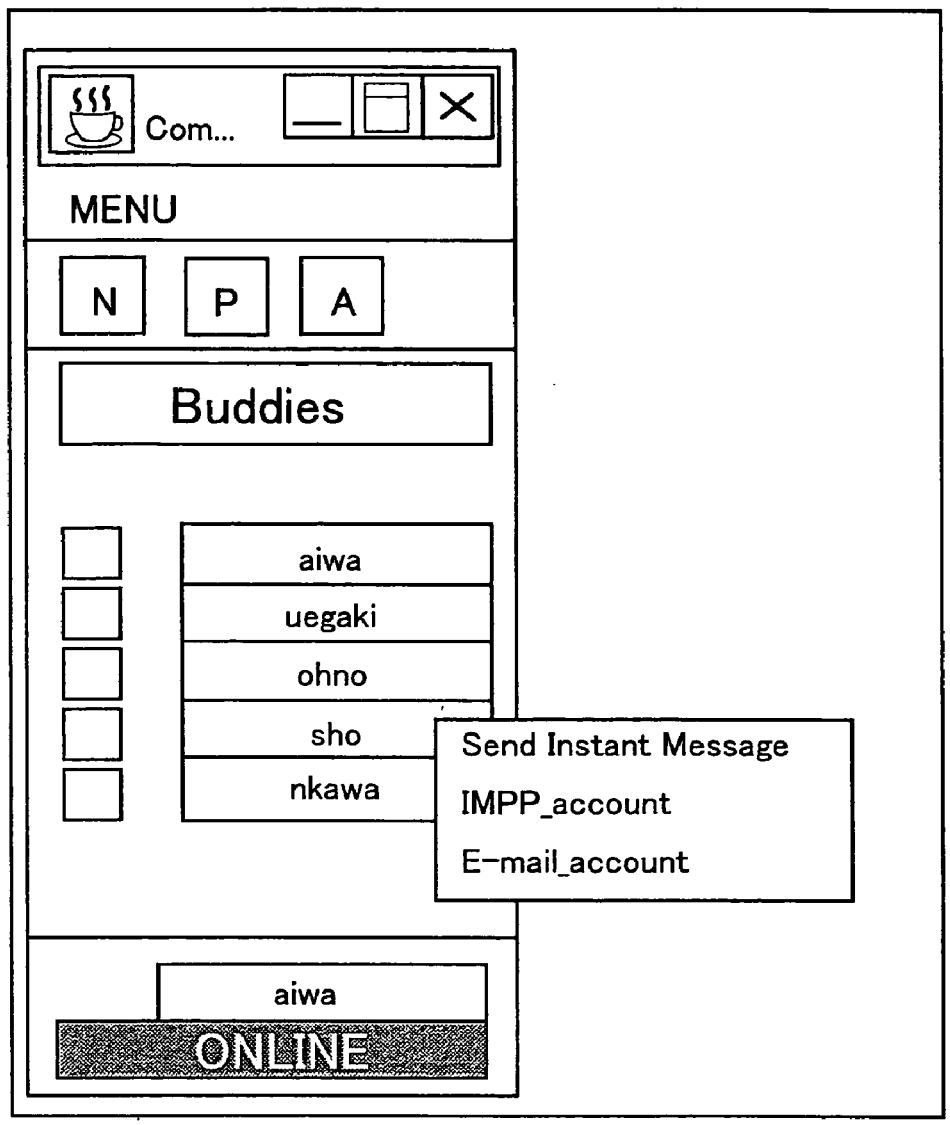
FIG. 9 is an example of a candidate list display (3)

FIG. 9 shows a display example when attribute information is not displayed and only the communication means are displayed.

Figure 10:
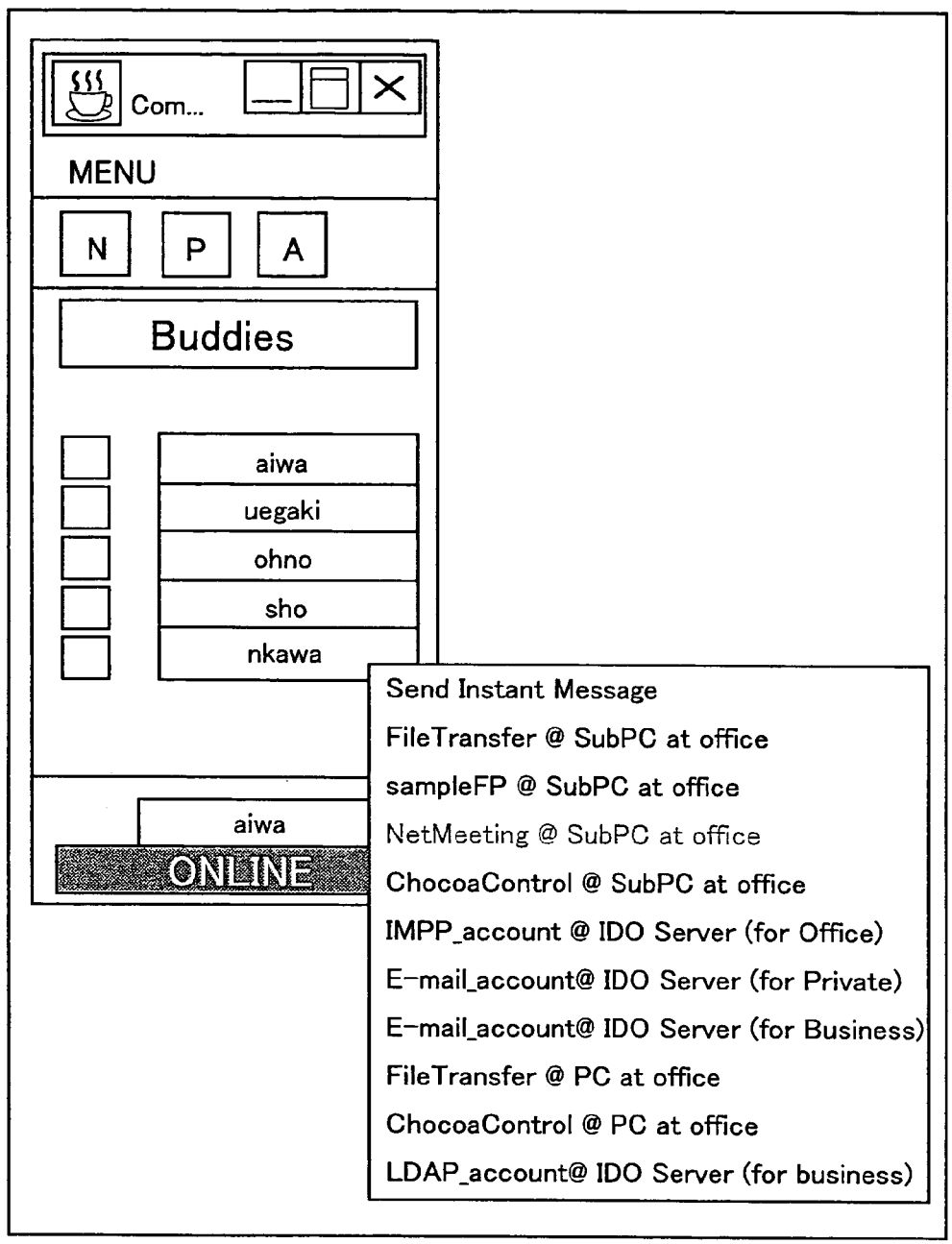
FIG. 10 is an example of a candidate list display (4)

FIG. 10 is a display example when one user has a plurality of information terminals and the display distinguishes among the respective information terminals. For example, in FIG. 10 the source user has the two user terminals "SubPC" and "PC," and can do file transfer at the respective terminals.

Figure 11:
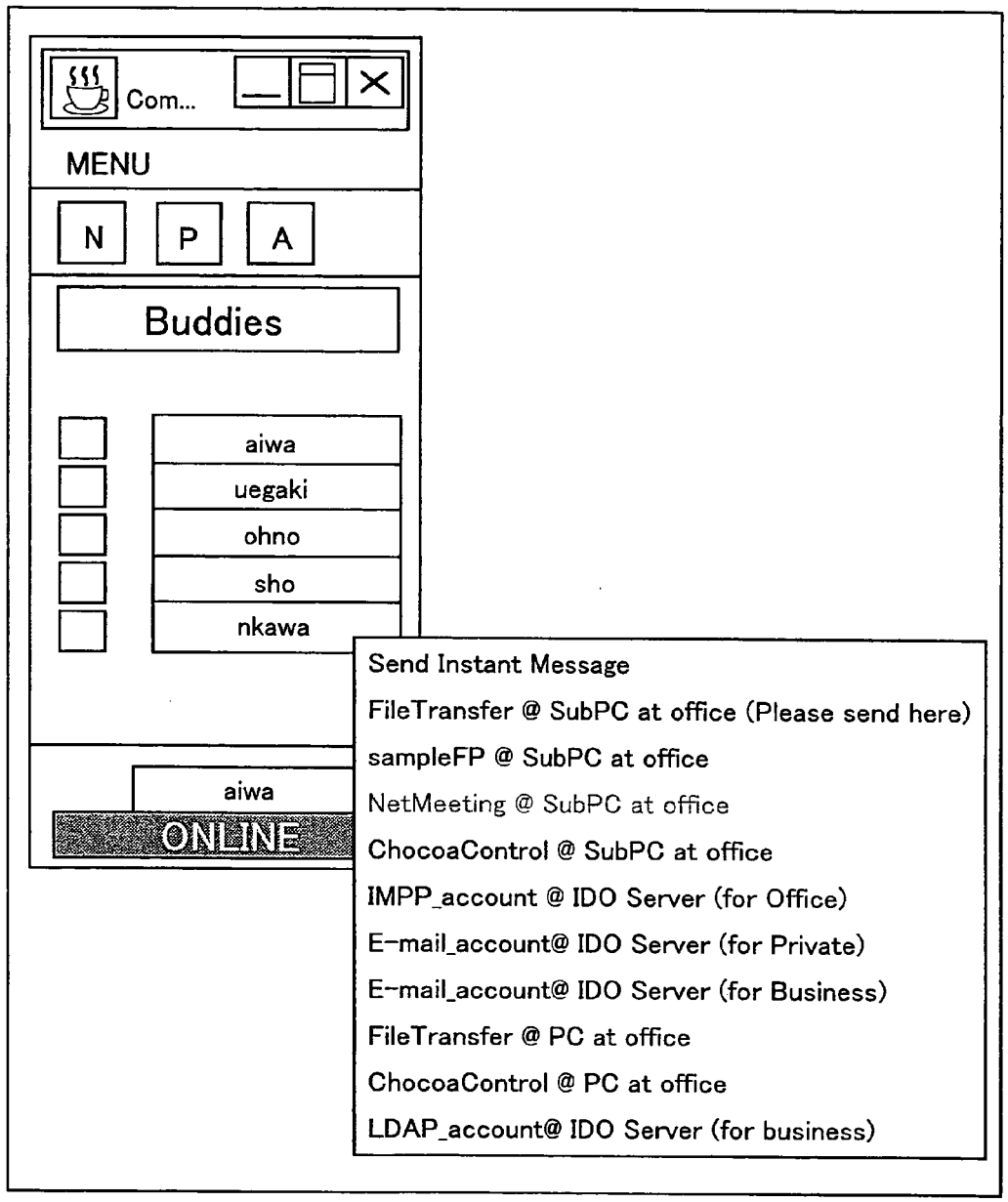
FIG. 11 is an example of a candidate list display (5)

FIG. 11 is a screen example showing a display example of other attribute information. The message "Please send here" is displayed after the communication means as attribute information.

(2) User Information Setting Window

Figure 12:
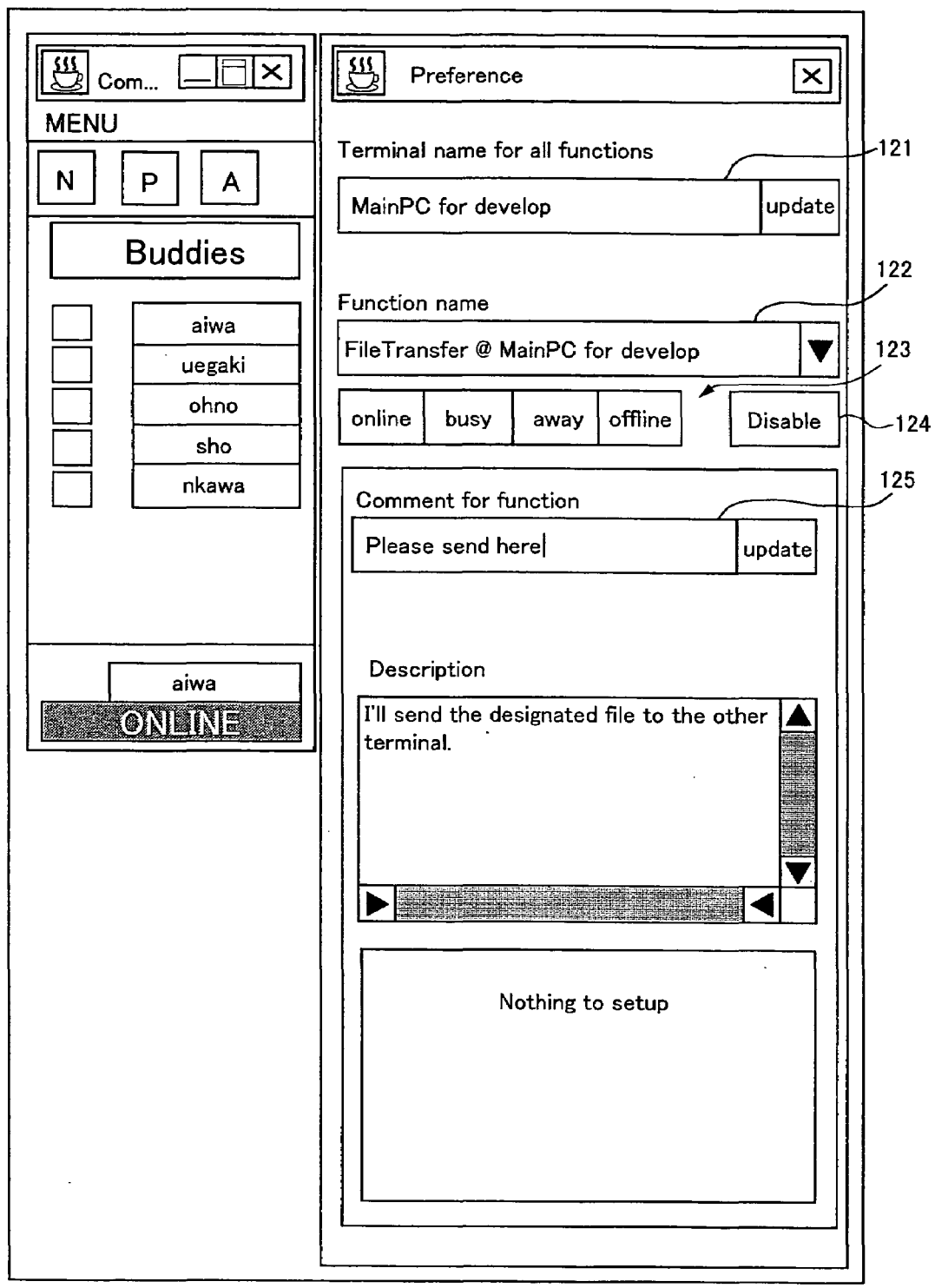
FIG. 12 is a example of user information setting window.
Figure 13:
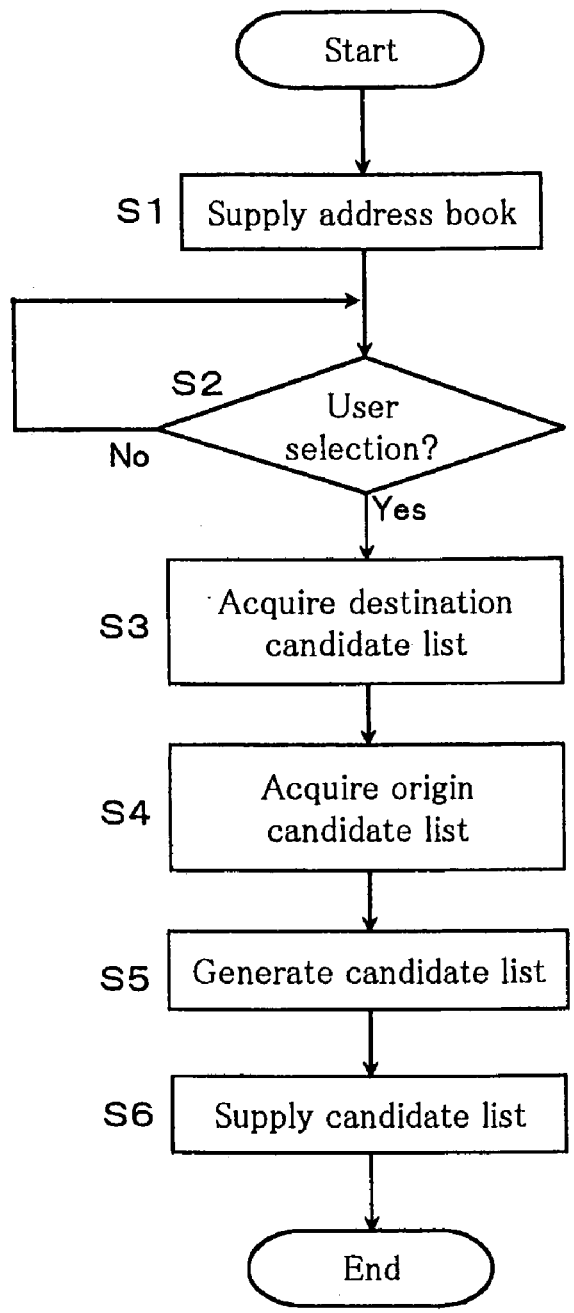
FIG. 13 is a flowchart showing one example of flow of processing performed by notification device.

FIG. 12 is an example of a window for inputting user information at the user terminal. A terminal name setting column 121, communication means setting column 122, status setting button 123, disable button 124, and comment column 125 are displayed in FIG. 12.

The terminal name setting column 121 is a field for setting the user terminal name for identifying user terminals.

The communication means setting column 122 is a field for setting operable communication means at the user terminal displayed at the terminal name setting column 121.

The status setting button 123 is a button for setting whether or not the communication means displayed in the communication means setting column 122 is usable; it is set for each status. In the picture, "FileTransfer" is set to be usable in the statuses "online," "away," and "offline."Conversely, "FileTransfer" is set so it cannot be used in "busy."

The disable button 124 is a button used when the user wants to avoid communicating using a communication means displayed in the communication means setting column 122. When this disable button 124 is pressed, communication using the relevant communication means is set as impossible, regardless of the setting status of the status setting button 123.

The comment column 125 is a field for setting attribute information. The picture shows an example in which the message "Please send here" is set as attribute information.

The user information setting window is preferably designed to enable setting required information other than the user information described above, in accordance with the configuration of the user table and the preference table.

Process Flow

Next, the flow of processing performed by the foregoing notification device 0.1 shall be specifically explained. Furthermore, in order to simplify the explanation, a case in which the notification device 1 is not provided in a user terminal (FIG. 2) shall be explained, but the same sort of processing is performed when it is provided in a user terminal (FIG. 3). The following process begins when a user terminal requests display of an address book.

In step S1 the address administration module 12 reads the address book from the address DB 11 and sends it to the user terminal via the WWW server 18. At the source user's terminal, the WWW browser 42 displays the received address book on the screen.

In step S2 the selection by the source user of any user as the destination user causes the display module 15 to acquire the user ID of the selected user via the WWW server 18. Step S3 subsequently ensues.

In step S3 the display module 15 sends the destination user's user ID to the acquisition module 16. The acquisition module 16 sends the user ID to the DBMS 3, and requests the list of communication means that the destination user can use, i.e. the destination candidate list.

The DBMS 3 searches the list DB 2 with the user ID as the key, and sends the acquisition module 16 the relevant user's usable communication means and their priority. The acquisition module 16 sends the acquired destination candidate list to the creation module 17.

In step S4 the creation module 17 reads the source user's usable communication means and each communication means' priority in the source user status from the user DB 13 and creates the originating candidate list.

In step S5 the creation module 17 creates a communication means list for sending to the display module 15. Specifically, the creation module 17 determines communication means that can be used by both the destination user and the source user from the originating candidate list and the destination candidate list. Next, the determined communication means are reordered in the source user's priority ranking and become the candidate list.

In step S6 the creation module 17 sends the candidate list to the display module 15. The display module 15 sends the candidate list to the user terminal via the WWW server 18. The candidate lists exemplified by the foregoing FIGS. 7–11 are displayed by the WWW browser 42 at the user terminal.

Subsequently, the communication means selected by the source user is reported from the startup module 43 to the communications module 19. Based on the user table, the communications module 19 negotiates with the notification device 1 administering the destination user terminal and decides the communication conditions. The startup module 43 transfers the communication conditions to the communication application 44, and starts the communication application 44.

In this embodiment before beginning communication with another user, the user reports the communication means that are mutually usable in the status at that point in time. Moreover, the communication means display can be made to reflect the circumstances of the source user, such as priority ranking and the like. Therefore the user who is trying to communicate can decide to enable communication that takes into account not just the other party's status but also his own circumstances.

Second Embodiment

In the foregoing first embodiment the destination user was selected by selecting any user in the address book. The selected user is specified using the user ID. However, destination user selection and designation can also be done by other methods.

For example, with a portable telephone an incoming call list in which incoming-call telephone numbers are noted is routinely prepared. There are also instances in which a telephone book created by a user or a list of mail addresses is stored in the user terminal. It is also possible to indicate a destination using this information. The following sort of processing is possible in such cases.

First, the user's communication address is also stored in the list DB 2. When a destination user is selected using any communication address or user name, the display module 15 acquires the user name or communication address and transfers it to the acquisition module 16 and the DBMS 3. However, the display module 15 also transfers an identifier indicating what the transferred information is. For example, a telephone number is transferred along with an identifier indicating that it is a telephone number.

The DBMS 3 searches the list DB 2 with a communication address, for example, as the key, and as described previously sends the destination candidate list to the acquisition module 16. Subsequent processes are the same as described previously.

Also, before searching the list DB 2, the display module 15 should search the address book and find the user ID, and may be set such that it will search the list DB 2 only if the user ID is not found.

In addition, if the communication means corresponding to the communication address used in designating the destination user is included in the created candidate list, the creation module 17 may display the relevant communication means at the start of the candidate list. Also, in this case, the startup module 43 may automatically start the relevant communication means without waiting for selection of a communication means by the user.

This embodiment enables a user to select the destination user using information usually stored at the user terminal side, which increases the convenience of the system even more.

Third Embodiment

Next, a notification system that begins communication by downloading a communication means when the source user terminal and/or the destination user terminal do not have that communication means shall be described in detail.

Outline

Figure 14:
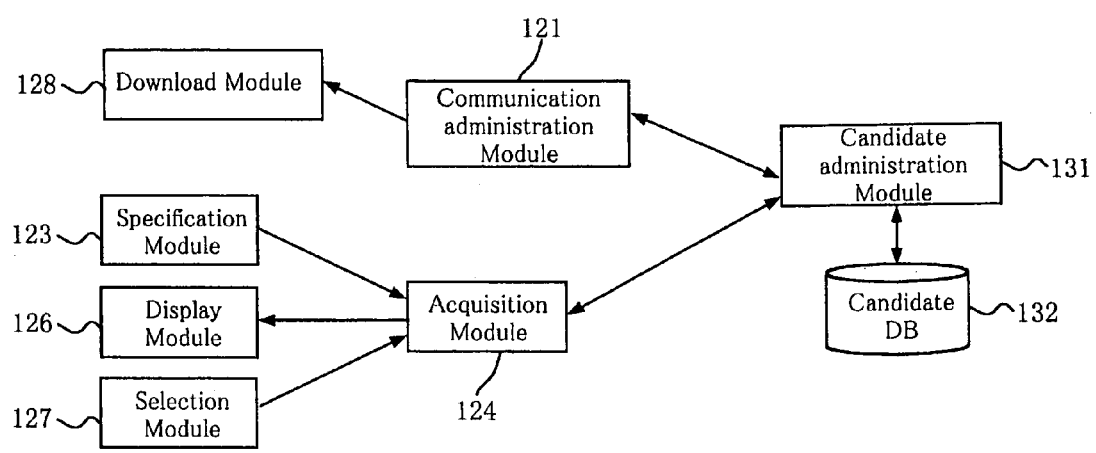
FIG. 14 shows basic principles of a notification system in a third embodiment.

FIG. 14 is an explanatory view illustrating principles of a notification system in this embodiment. This notification system has a communication administration module 121, designation module 123, acquisition module 124, display module 126, selection module 127, downloading module 128, candidate administration module 131, and candidate DB 132. The candidate DB 132 is equivalent to the list DB in the foregoing FIG. 2.

A communication means useable at a user terminal is reported from the communication administration module 121 to the candidate administration module 131, and stored in the candidate DB 132. When a user specifies a destination user, a list ("α-list" below) of communication means useable by the destination user is sent from the candidate administration module 131 to the acquisition module 124, and displayed at the user terminal by the display module 126. If a communication means that a certain user terminal does not have is selected, the user terminal that does not have that communication means downloads the communication means using the downloading module 128. By doing so, the selected communication means is started at both user terminals, and communication begins.

By utilizing this notification system, when a user terminal does not have the selected communication means that communication means is downloaded to the user terminal. Therefore the user can begin communication using the desired communication means.

Configuration

Figure 15:
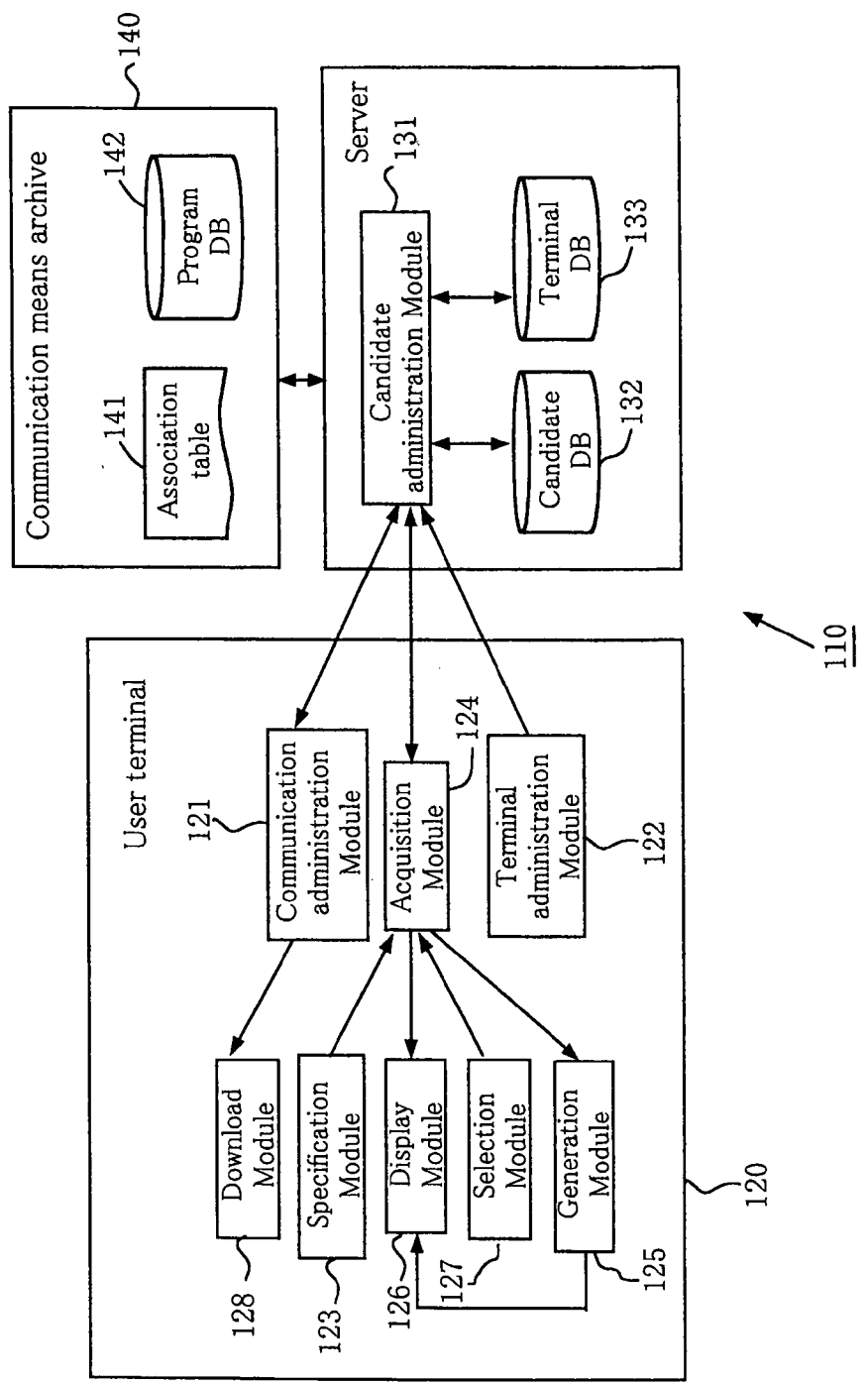
FIG. 15 is a functional block diagram of the notification system in the third embodiment.

FIG. 15 is a functional block diagram showing the structure of a notification system in accordance with the third embodiment. This notification system 110 consists of a user terminal 120, server 130, and communication means archive 140 connected by a network such as the Internet. Furthermore, the drawing shows only one user terminal, but a plurality of user terminals is connected to the server.

The user terminal has a communication administration module 121, terminal administration module 122, designation module 123, acquisition module 124, creation module 125, display module 126, selection module 127, and downloading module 128. The communication administration module 121 reports communication means that the user terminal has to the server. The communication administration module 121 also receives a report of the communication means selected by the source user and starts that communication means. The terminal administration module 122 reports memory amount or Java™ version, for example, to the server. The designation module 123 receives the destination user designation from the user and reports it to the server.

The acquisition module 124 acquires the α-list of useable communication means at the user specified as the destination from the candidate administration module 131. The creation module creates a list of communication means that both users can use (hereinafter "candidate list") from a β-list of communication means that the source user can use and the α-list acquired from the server. The display module 126 displays the candidate list at the user terminal. The selection module 127 reports the communication means selected from the candidate list to the candidate administration module 131. The downloading module 128 acquires a communication means that the user terminal does not have from a communication means supplier.

The server has the candidate administration module 131, candidate DB 132, and terminal DB 133. The candidate administration module 131 stores communication means operable at each user terminal in the candidate DB 132 and stores each user terminal's terminal information in the terminal DB 133. Information stored in the candidate DB 132 is the same as the information in the list DB shown in the foregoing FIG. 6; at the very least, information specifying the user, communication means, and "useable?" are stored. The candidate administration module 131 also acquires communication means useable by the specified destination user from the candidate DB 132 and reports this to the source user terminal. In addition, the candidate administration module 131 searches the communication means archive for communication means that can be downloaded to the destination user terminal, and writes these to the α-list.

The communication means archive has a table of correspondences and a program DB. Contained in the table of correspondences are the download conditions necessary for downloading communication means to a terminal, and the execution conditions necessary for executing the communication means at the terminal. For example, it can list the terminal memory amount necessary for downloading or executing a communication means. The program DB stores an execution format of the communication means, i.e. a communication application.

Figure 16:
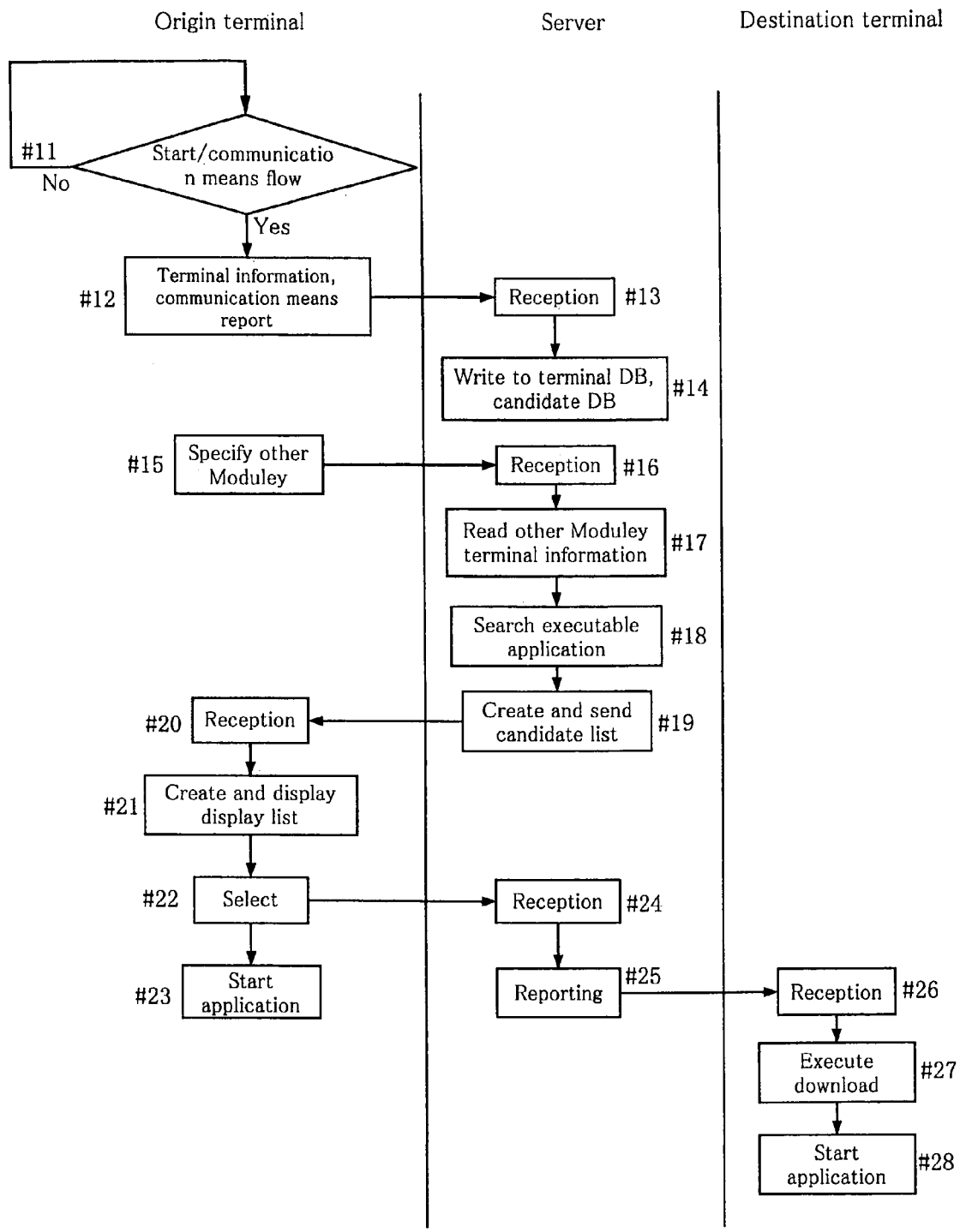
FIG. 16 diagrams process flow in the third-embodiment notification system.

FIG. 16 is a drawing illustrating the process flow in a notification system with the foregoing configuration when the destination user terminal downloads a communication means.

When starting, the user terminal reports communication means the user terminal has to the server (#11, #12). Also, if a usable communication means becomes unusable or an unusable one becomes usable, the user terminal reports that change to the server (#11, #12). As was the case in the foregoing first embodiment, switching communication means between usable and unusable may be done automatically by the user terminal to correspond to changes in user status, or may be done by user input.

In addition, when starting, the user terminal reports specified terminal information to the server (#11, #12). This terminal information, as described later, is information used for deciding whether or not a communication means can operate at a user terminal. For example, if a user terminal receives a Java™ applet, the Java™ version and memory amount are reported to the server.

The server receives communication means and terminal information (#13), and writes it to the candidate DB 132 and the terminal DB 133 (#14). When the server receives a change in communication means usable/unusable status from the user terminal, the details thereof are written to the candidate DB 132. In this way the candidate DB 132 stores the latest information about whether or not a communication means at a terminal is usable.

If a user specifies a destination user after the user terminal starts (#15), the server reads the destination user terminal's terminal information from the terminal DB 133 (#16, #17). Specifying the destination user may be done using a WWW server and WWW browser in the same manner as in the foregoing first embodiment. This may also be done by inputting the user name or a user ID previously attached to the user.

The server searches for communication means that can be executed at that terminal, based on the destination user's terminal information and the correspondence table in the communication means archive (#18). The server also refers to the candidate DB 132 and creates a list of usable communication means at the destination user's terminal. In communication means at the destination user's terminal. In addition, the server also creates the β-list, to which is added the foregoing communication means search results and useable communication means in the candidate DB 132, and sends it to the source user terminal (#19).

Upon receiving the α-list, the source user terminal creates the β-list of useable communication means from among the communication means at the local terminal, and extracts communication means that are on both the α-list and the β-list and creates the candidate list (#20, #21). The candidate list is displayed at the user terminal (#21). If any of the communication means on the candidate list is selected, the selected communication means is reported to the server. Presently, a communication means that the source user terminal has and the destination user terminal does not yet have but which can be downloaded and executed is selected.

When the communication means is selected, the communication means and conditions necessary for communication are both reported to the server. The conditions are data transfer rate or the server name used in communication, for example. Also, the selected communication means is started at the source user terminal (#23).

Meanwhile, the server reports the selected communication means to the destination user terminal (#24, #25). The destination user terminal downloads the communication means—that is, a communication application—from a communication means supplier, and starts it (#26, #27, #28). In this way communication begins between the source user terminal and the destination user terminal using the selected communication means.

Furthermore, before downloading the communication means to the destination user terminal, the user terminal can carry out a confirmation process with the user. For example, when the user terminal receives a report of a communication means from the server, it displays a screen message such as "User A requests communication using BBB. Do you want to download it?" Then, depending on the user's response to this message, the download is executed or interrupted. If the download is interrupted, the reason therefor should be reported to the source user terminal via the server.

Screen Example

FIG. 17 is an example of a candidate list displayed on a user terminal in the foregoing notification system. In FIG. 17(*a*), communication means that the destination user terminal does not have but which can be executed if downloaded are initially displayed as "downloadable." Then, when "downloadable" is selected, the executable communication means are individually displayed.

when "downloadable" is selected, the executable communication means are individually displayed.

In FIG. 17(*b*) the communication means that can be executed at the destination user terminal are displayed along with communication means that already exist. However, "downloadable" is displayed after the communication means name, making it possible to identify communication means that haven't been installed yet. Here it is also possible not to have the description "downloadable." In this case, as in FIG. 7 in the foregoing first embodiment, the downloadable communication means can be displayed in italics, and do not need a description to distinguish them from other communication means.

Fourth Embodiment (A) In the foregoing third embodiment, the user terminal merges the α-list of communication means that the destination user can use and the β-list of communication means that the source user can use. However, this processing can also be done by the server. In that case, providing a creation module at the user terminal is unnecessary.

(B) In the foregoing third embodiment, both a correspondence table and a program DB are provided in the communication means archive. However, they may be provided separately, or may be provided in the server.

(C) In explaining the foregoing third embodiment, the case in which the source user terminal already had the communication means, and the destination user terminal did not have it but the source user selected an executable communication means, was described. However, the same sort of processing can be done in the opposite situation.

It is also possible for the candidate list to describe communication means that neither the source user nor the destination user terminal has. In such a case, for example, the source user terminal sends its local terminal information to the communication means archive and obtains a list of executable communication means. The source user terminal adds useable communication means that it already has at the local terminal and creates the β-list. In addition, the source user terminal creates the candidate list from the shared parts of the α-list sent from the server and created the β-list.

However, there is a possibility that the number of types of communication means executable at both user terminals is very large. Therefore a priority ranking should be applied to the communication means in advance, and the communication means should be displayed as the candidate list in priority ranking sequence up to a specified rank. It would then be possible to display lower-ranked communication means by user request.

Fifth Embodiment

Next, a notification system that correlates and administers communication means when a single user has a plurality of terminals shall be explained in detail.

Outline

Figure 18:
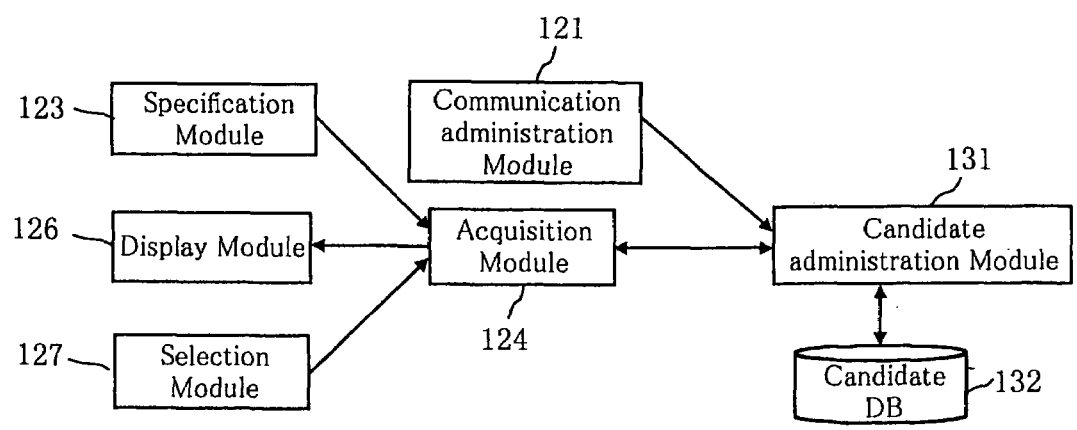
FIG. 18 shows basic principles of a notification system in a fifth embodiment.

FIG. 18 is an explanatory view illustrating principles of a notification system in this embodiment. With the exception of not having the downloading module 128, this notification system has functions like the notification system of the third embodiment. That is, this notification system has communication administration module 121, designation module 123, acquisition module 124, display module 126, selection module 127, candidate administration module 131, and candidate DB 132.

Communication means usable at the user terminal are reported from the communication administration module 121 to the candidate administration module 131, and stored in the candidate DB 132. When the user specifies a destination user, the list of communication means usable by both the originating and destination user (the candidate list) is sent from the candidate administration module 131 to the acquisition module 124, and displayed at the user terminal by the display module 126. If the destination user has a plurality of terminals, the candidate list is displayed with the communication means grouped by communication means category.

Employing this notification system enables the destination user terminal to be selected according to the destination user's location or status. The source user does not engage in futile communication, and the destination user: can receive a communication request at the information terminal that best fits his circumstances.

Configuration

Figure 19:
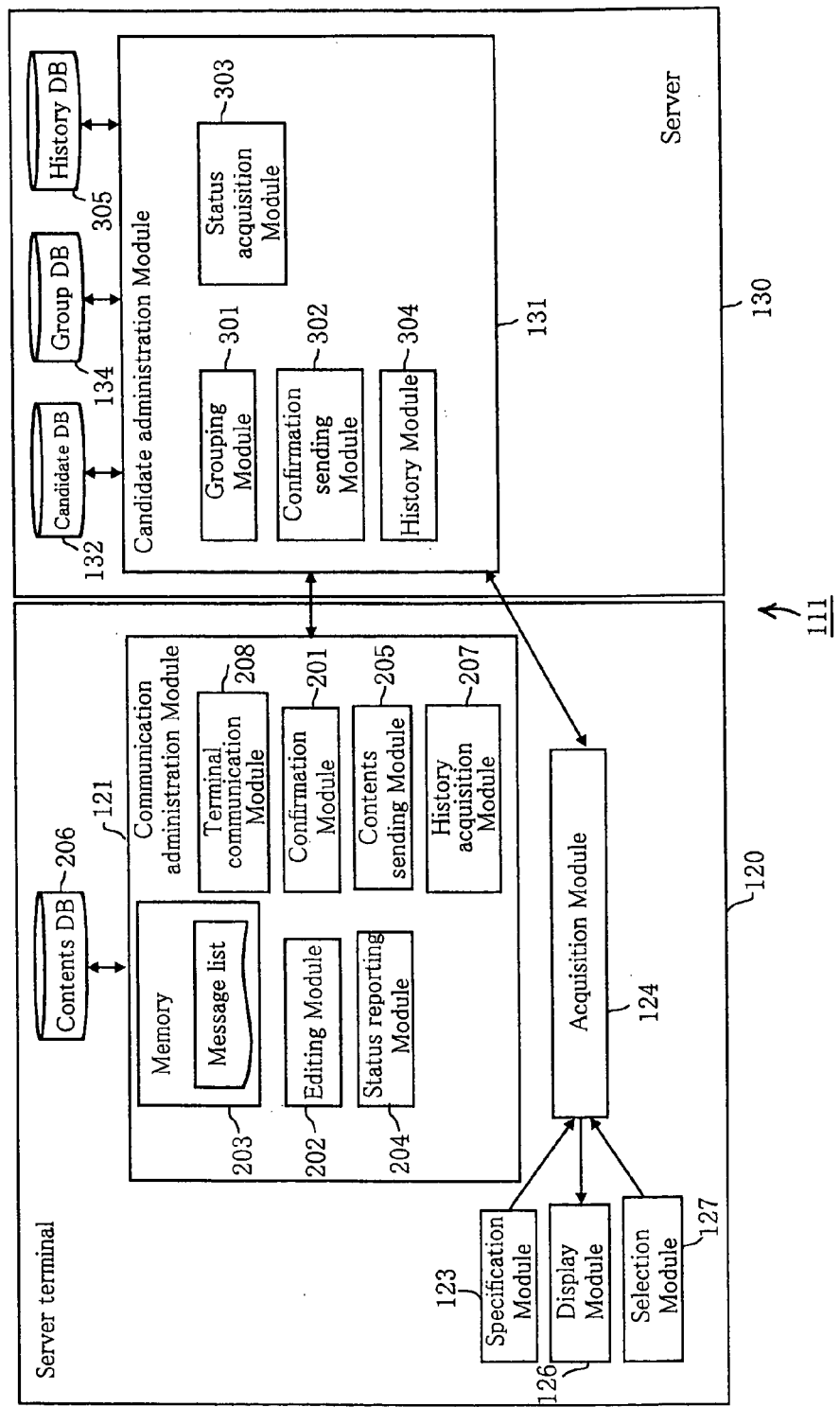
FIG. 19 is a functional block diagram of the notification system in the fifth embodiment.

FIG. 19 is a functional block diagram showing the structure of notification system 111 in accordance with the fifth embodiment. This notification system consists of the user terminal 120 and server 130 connected by a network such as the Internet. Furthermore, the drawing shows only one user terminal, but a plurality of user terminals is connected to the server.

(1) User Terminal

The user terminal has a communication administration module 121, designation module 123, acquisition module 124, display module 126, and selection module 127. The communication administration module 121 reports communication means that the user terminal has to the server. In this example the communication administration module 121 receives notification of the communication means selected by the source user from the server, and starts that communication means. In addition, the communication administration module 121 has the function of reporting communication means status to the server. The communication administration module 121 preferably also has supplementary functions in addition to the communication means reporting function and starting function. These supplementary functions shall be described later.

The designation module 123 receives the destination user designation from the user and reports it to the server. The acquisition module 124 acquires the list of communication means usable by both the source user and destination user—that is, the candidate list—from the candidate administration module 131. The display module 126 displays the candidate list on the user terminal. The selection module 127 reports the communication means selected from the candidate list to the candidate administration module 131.

(2) Server

The server has candidate administration module 131 and candidate DB 132 and group DB 134. Based on reports from the communication administration module 121, the candidate administration module 131 stores user terminals and communication means usable at those terminals in the candidate DB 132. The candidate administration module 131 has grouping module 301. Using this, it refers to candidate DB 132 and groups the communication means at each terminal belonging to a single user by communication means category, and stores the results in group DB 134.

The candidate administration module 131 also obtains communication means usable by the designated destination user and communication means usable by the source user from the group DB 134 and creates the candidate list, and reports it to the source user. Further, the candidate administration module 131 preferably has other supplementary functions. Supplementary functions of the candidate administration module 131 shall be described later.

FIG. 20 is a summary drawing explaining the data stored in the candidate DB 132. The candidate DB 132 stores user name, communication means, "usable?," update time, communication status, and message. "User name" preferably is information that can specify a user; user ID may also be used. "Communication means" records the type of communication means and the terminal name. For example, "IM @ Office" indicates instant message in a terminal at the office.

"Usable?" records information indicating whether or not a communication means at the user terminal is usable.

"Update time" records the latest update time for this entry. "Communication status" records the status of the communication means: "active," "standby," "communication requested." "Message" records a message the user has set for the communication means. In FIG. 20 the message "I'm here" has been set for the communication means "IM @ Office."

FIG. 21 is a summary drawing explaining the data stored in the group DB 134. Among the communication means stored in the candidate DB 132, those communication means that are in "usable" status are grouped by predetermined criteria and recorded in the group DB 134. In this example communication means functions are utilized by the grouped criteria. User name, communication type, link, priority ranking, and preference information are stored in the group DB 134.

As with user name in the foregoing candidate DB 132, "user name" is information that specifies the user. "Communication type" records the function of the communication means. In FIG. 21 the communication means functions are shown as messaging, NetMeeting, FileTransfer, and telephone. "Link" records a combination of user terminal and communication means at that terminal, or communication means. For example, in FIG. 21 the communication means that can use the messaging function for user A are "IM @ office/lab" or "e-mail."

"Priority ranking" records the priority ranking assigned to communication means having the same communication function. Priority ranking is information that is not always necessary in the group DB 134. Priority ranking may be assigned by the user, as will be described later. It may also be assigned by the server according to user status when the candidate DB 132 records the user status (equivalent to the list DB) as in the first embodiment.

"Preference information" records information specifying the user and the communication means most recommended by that user. In FIG. 21 user A recommends that user "nkawa" use IM @ office/lab" and that user "kohda" use "e-mail" for the messaging function. The communication means recommended by each user is also prioritized by the "priority ranking" setting.

(3) Communication Administration Module Supplementary Functions

As noted earlier, the communication administration module 121 preferably has supplementary functions. In this example the communication administration module 121 has a confirmation module 201, editing module 202, storage module 203, status reporting module 204, contents sending module 205, contents DB 206, history acquisition module 207, and terminal communications module 208 for implementing supplementary functions.

Before communication begins, the confirmation module 201 obtains the source user's approval and then communication occurs. When a communication function is selected, the confirmation module 201 reports to the user via the server that the communication function is being used. In addition, the confirmation module 201 receives approval of the communication and communication occurs with the responding user terminal.

The editing module 202 receives user editing of the previously described group DB 134 or the message for a communication means and sends it to the server. A user can use the editing module 202 to group communication means at the local terminal or add messages to communication means. The messages set for communication means are stored in the storage module 203 as a message list. In addition, the editing module 202 preferably is able to receive user changes in whether or not an operable communication means at the other user's terminal can be used, and send these to the server.

The storage module 203 stores the message list. FIG. 22 is a conceptual diagram explaining the message list. Communication means and messages set by the user are associated and stored in the message list. In addition to the message list, the storage module 203 stores specific information such as the name of the user terminal. A terminal name is "office" or "lab," for example, and is information for distinguishing among user terminals. The user uses the editing module 202 to set a terminal name.

The status reporting module 204 reports communication status of the communication means at the user terminal to the server. The "communication status" of the candidate list is updated according to this report. The status reporting module 204 also acquires the communication status at the user's other terminals and reports this to the server.

The contents sending module 205 stores specific information, including communication contents, in the content DB 206 when communication is executed by a communication means that the user terminal has. FIG. 23 is an explanatory diagram summarizing the information stored in the content DB 206. The content DB 206 stores communication means, communication contents, start time, end time, and messaging party. "Communication means" records both the communication means and terminal name. "Communication contents" records the data sent and received. For example, if the communication means is instant message (IM), the contents of the message are recorded in the communication contents. "Start time" and "end time" record the communication start and end time respectively. "Messaging party" records the source user.

The contents sending module 205 also sends specific information, including communication contents, to other terminals of the same user via the server. This makes it possible for the user to acquire communication contents that occurred at his terminal 1a at another of his terminals, 2a.

The terminal communications module 208 detects other user terminals near the local terminal by wireless means. For example, a detection data string is sent by wireless means, and a data string in response to this is received, thus detecting the other terminal.

The history acquisition module 207 acquires the user's communication history from the server's history DB 305, to be described later, and reports this to the user.

The terminal communications module 208 establishes a data link between the local terminal and the other terminal when another terminal is detected. Then data is transferred, with the terminal used by the user as the master side and the other terminal as the slave side. The master terminal communications module 208 asks the slave terminal communications module 208 to report the terminal name and usable communication means. In addition, the master terminal communications module 208 uses the response to this request and reports to the server, with the slave terminal's communication means forming a module of the master's communication means. All data to be sent and received between the slave terminal and the server is relayed using the master terminal communications module 208. If the terminal communications module 208 function is used, when a single user uses a plurality of terminals the usable communication means at the currently used terminal and at other terminals can be included in the candidate list.

(4) Server Supplementary Functions

As described previously, the server preferably has supplementary functions. In this example the server has a confirmation sending module 302, status acquisition module 303, log module 304, and history DB 305 for executing-supplementary functions.

The confirmation sending module 302 is provided in the server to correspond to the confirmation module 201 in the communication administration module 121. The confirmation sending module 302 sends a receipt confirmation for all usable communication means selected as a communication function by the source user. The confirmation sending module 302 also sends the source user terminal an answer with regard to receipt confirmation.

The status acquisition module 303 is provided in the server to correspond to the status-reporting module 204 in the communication administration module 121. The status acquisition module 303 receives communication status from the user terminal and updates the candidate DB 132's "communication status." Also, the status acquisition module 303 reports changes in the status of communication means at other user terminals to the same user's terminal.

The log module 304 stores the names of communication means started and finished at each user terminal in the history DB 305 in accordance with communication status from the user terminal. The history DB 305 may also store communication contents too. In response to a request from the user terminal, the log module 304 reads the user's communication history from the history DB 305 and sends it to the requesting user terminal.

Process Flow

Next, the processing flow in a notification system that has the previously described functions shall be explained in detail.

(1) Main Process

Figure 24:
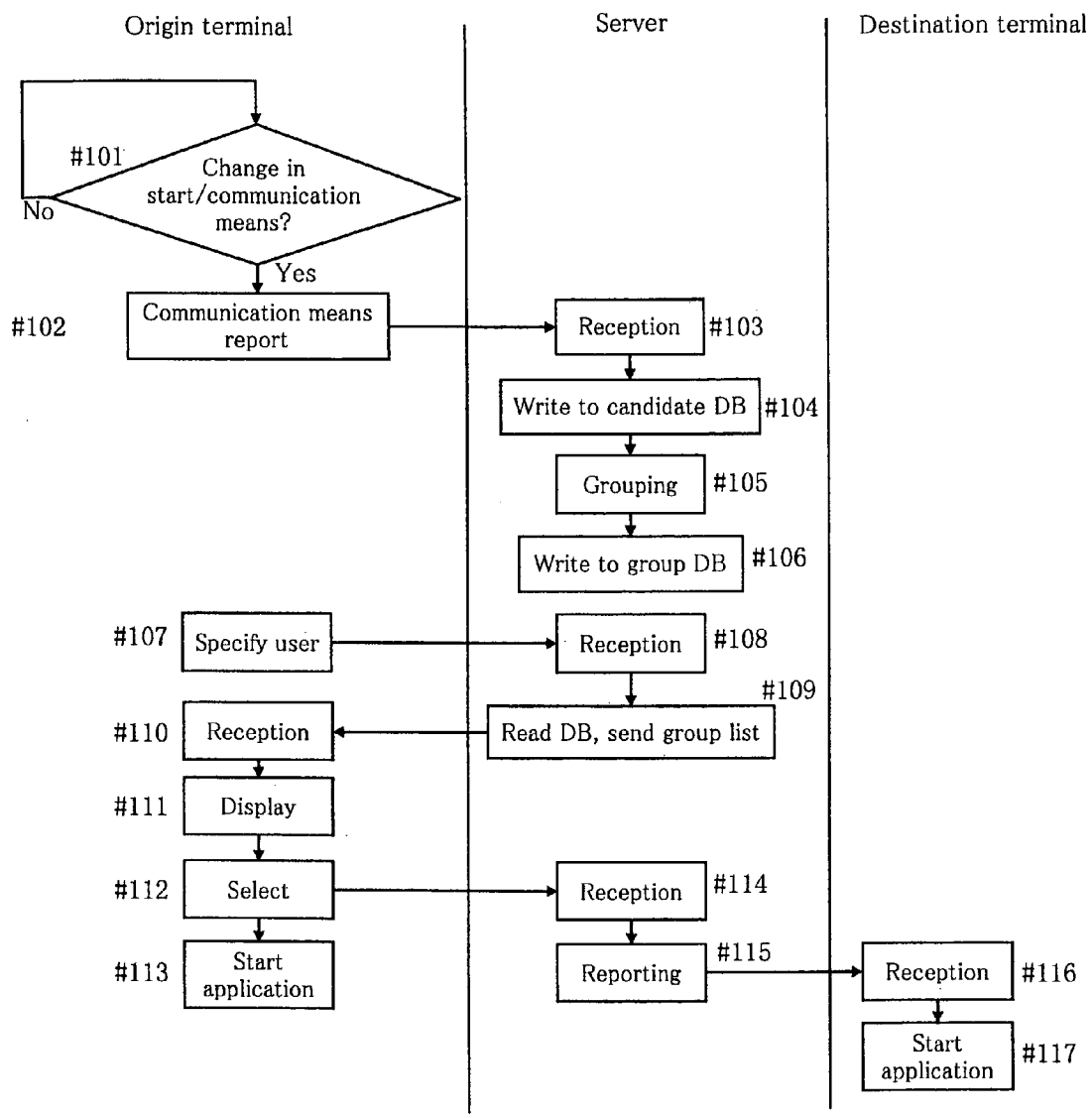
FIG. 24 diagrams process flow in the fifth-embodiment notification system.

FIG. 24 is a diagram explaining the main processing flow in the notification system of this embodiment. In this process, the source user selects a communication function—that is, a group of communication means—and requests communication.

First, at startup, the notification device reports communication means the local terminal has to the server (#101, #102). Also, if a communication means becomes usable or unusable, the notification device reports the new status to the server (#101, #102).

The server updates the candidate DB 132 based on the report from the user terminal (#103, #104). In addition, the server groups communication means and updates group DB 134 based on the new contents of the candidate DB 132 (#105, #106). For example, in the candidate DB 132 shown in FIG. 21 suppose "IM @ Office" changes from "usable" to "unusable." In this case, the messaging "IM @ Office" is deleted from the group DB 134 shown in FIG. 22.

When any user is specified as the destination user, the server reads the group DB 134 for the destination and source users, creates a candidate list, and sends it to the source user terminal (#107, #108, #109). If a priority ranking or preference is set in the group DB 134, the communication means described in the candidate list are determined based on this information. It is also possible to make a communication means' priority higher according to the latest update time in the candidate DB.

For example, the server lists only the communication means with the highest priority for the source user within the same group on the candidate list. Communication means usable by both users are grouped by each communication function and displayed at the source user terminal (#110, #111). Examples of displayed candidate lists are the screen samples shown in the previously described FIG. 7 and FIG. 8.

When the source user selects any of the communication means from the displayed candidate list, the communication means is started at the user terminal (#112, #113). Meanwhile, the selected communication means is reported via the server to the destination user terminal (#114, #115).

The destination user terminal starts the communication means in accordance with the communication means report (#116, #117).

In this process, assigning correspondences to the users administrates user communication means existing diversified among a plurality of terminals. Therefore the user can easily know what communication means are present at the other user's plurality of terminals, and smooth communication is possible.

(2) Confirmation Process

Figure 25:
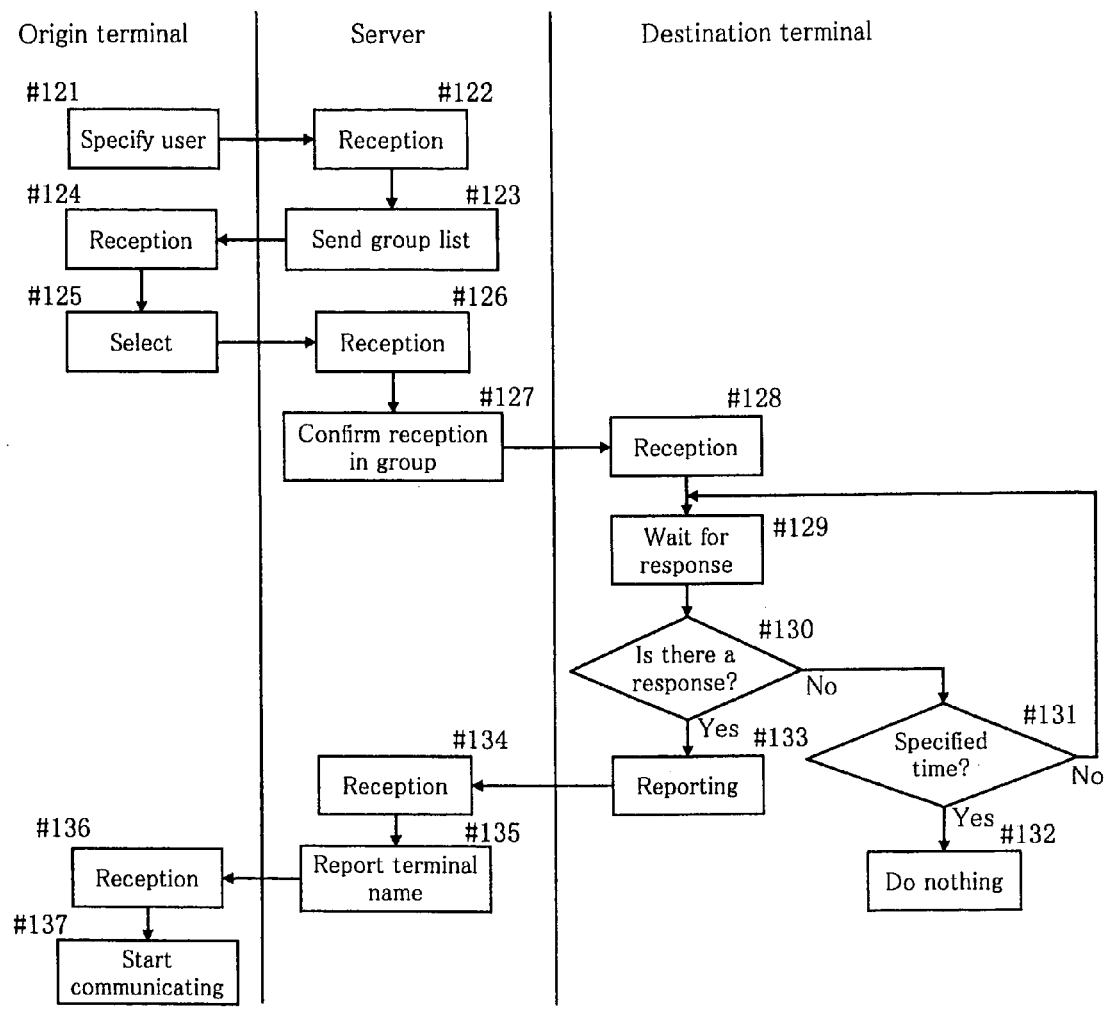
FIG. 25 diagrams process flow in a confirmation routine in the fifth-embodiment notification system.

FIG. 25 is a diagram explaining the confirmation processing flow performed by the notification system. In this processing, communication begins after confirming the destination user's intent.

The source user specifies a destination user and selects a communication means from the candidate list (#121–#125). This processing is the same as #107–#112 in the foregoing main process. The server sends a reception confirmation to all destination user terminals that can use the selected communication means (#126, #127).

The source user and the communication means are reported to the destination user terminal that received this (#128, #129). For example, a message such as "User A wants to telephone you. Do you want to communicate?" is displayed at the terminal. The destination user terminal waits for a designated time for a user response to this message, and reports the response to the server (#130, #133). If there is no response within the designated time, nothing happens (#131, #132).

Upon receiving a response, the server reports the response contents to the source user terminal (#134). FIG. 25 diagrams the routine when the response is "communicate." In this case, the server reports the name of the terminal that responded to the source user terminal (#134, #135). The source user terminal starts communication with the reported terminal using the selected communication means (#136, #137).

Furthermore, if the response is "don't communicate," the source user terminal reports the response contents to the user.

(3) Communication Status Broadcast Process

Figure 26:
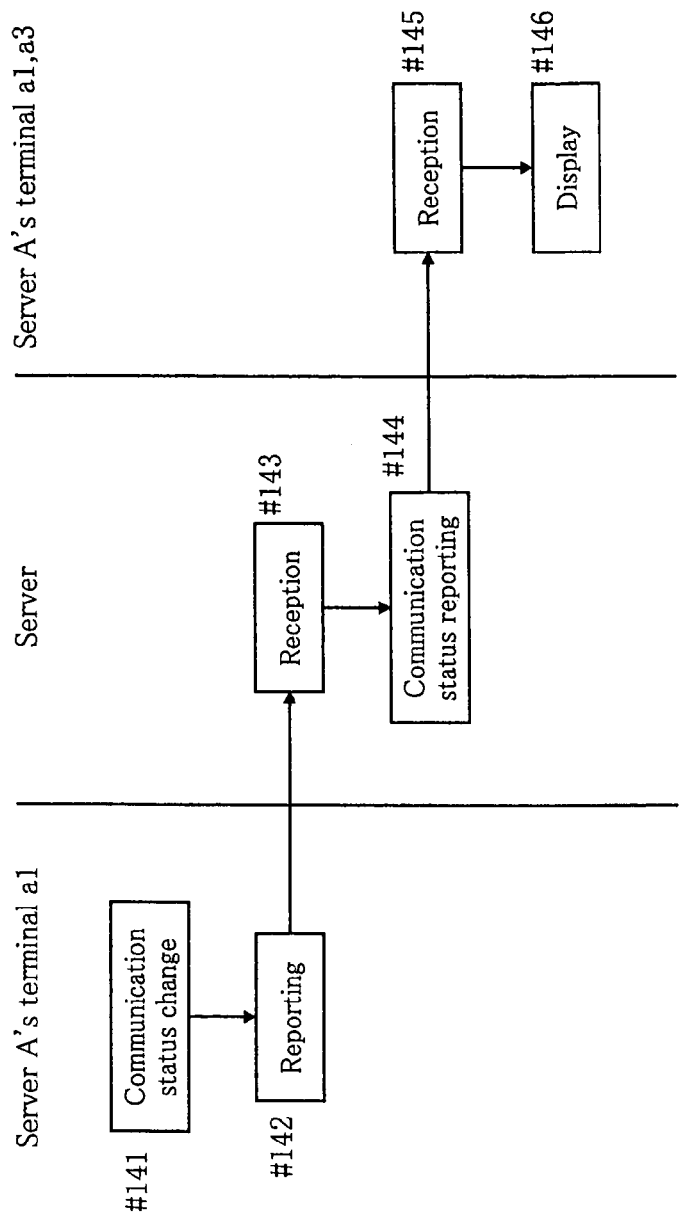
FIG. 26 diagrams process flow in a communication status broadcast routine in the fifth-embodiment notification system.

FIG. 26 is an explanatory diagram showing the flow of communication status broadcast processing performed by the notification system. In this process, the communication status of user terminal a1 is broadcast to the user's other terminals: a2, a3 . . .

User A has a plurality of terminals: a1, a2, a3 . . . When some sort of change in communication status occurs at a certain terminal a1, this change is reported to the server (#141, #142). For example, terminal a1 has a telephone call, or an instant message is received.

Based on this report, the server reports the terminal name, communication means, and new communication status to user A's other terminals: a2, a3 . . . (#143, #144). Based on this report, the other terminals a2, a3 . . . report the change in communication status at terminal a1 (#145, #146). For example, they display a message such as "Terminal a1 has received a telephone call."

(4) Communication Content Acquisition Process

Figure 27:
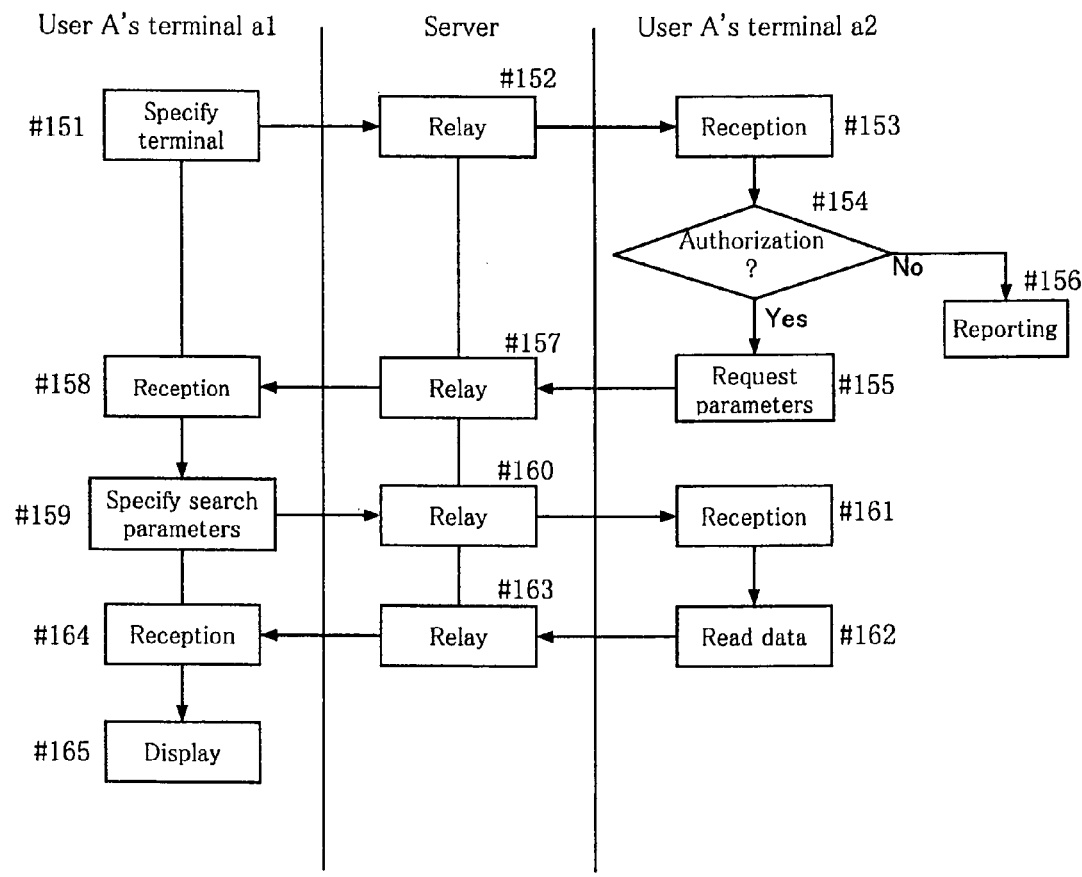
FIG. 27 diagrams process flow in a communication contents acquisition routine in the fifth-embodiment notification system.

FIG. 27 is a diagram illustrating a communication content acquisition routine performed by the notification system. In this process user A acquires the contents of communication conducted at his own terminal a2 at another of his terminals a1 via the server.

First, user A designates one of his plurality of terminals (a2), and requests the contents of communications conducted at that terminal (#151). The server relays the request to the specified terminal a2 (#152).

The designated terminal a2 performs the designated authorization processing with terminal a1, and confirms whether or not the requestor has the right to acquire the communication contents (#153, #154). If authorized, terminal a2 requests search conditions (#155). For example, it requests conditions such as a range of communication start times, the messaging party, or communication means, for extracting data from the contents DB 206. On the other hand, if not authorized, the authorization result is reported to terminal a1 via the server (#156).

Terminal a1 receives input of search conditions from the user and sends them to terminal a2 via the server (#158, #159, #160).

Terminal a2 searches the contents DB 206 based on the designated search conditions, extracts data, and sends it to terminal a1 (#161, #162, #163). For example, if a range of communication start times is designated, the contents of communication that began during that range are read and sent to the terminal a1. In addition to communication contents, the extracted data can be information stored in the contents DB 206. In this way user A can acquire at different terminal a1 the content of communications conducted at terminal a2, or the messaging party.

(5) Communication Log Acquisition Process

Figure 28:
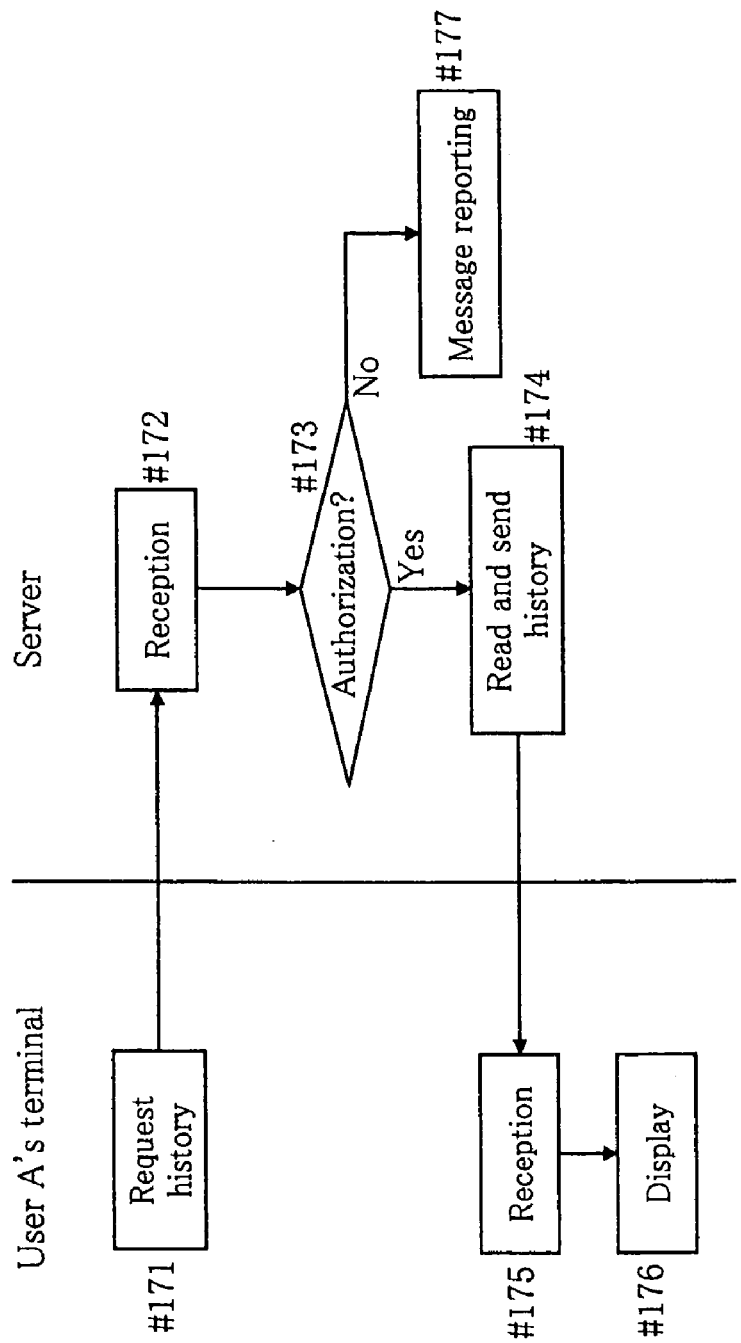
FIG. 28 diagrams process flow in a communication acquisition log routine in the fifth-embodiment notification system.

FIG. 28 is an explanatory diagram showing communication log acquisition process performed by the notification system. In this process user A can acquire the history of communications at his plurality of terminals a1, a2, a3 . . . at any of his terminals.

When user A requests the communication log at any terminal a1 (#171), the server decides whether or not the user has the right to acquire the communication history using a predetermined authorization process (#172, #173). If the user is authorized, the server reads the communication log at all terminals of the relevant user from the history DB 305 and sends it to the requesting terminal a1 (#174, #175). The communication log at all of user A's terminals is displayed at terminal a1 (#176). If not authorized, the server sends a predetermined message to the requesting terminal a1, for example, and terminal a1 reports to the user that it is not authorized (#177).

Sixth Embodiment (A) In the foregoing fifth embodiment a single user's communication means were grouped by communication means function, but they may also be grouped by other criteria.

Other Embodiments (A) The foregoing first through sixth embodiments were individually explained, but it is possible to appropriately combine and practice each embodiment.

(B) Recording media recording programs for executing the methods described in the foregoing first through sixth embodiments are included in the present invention. Examples of these recording media include computer-readable floppy disks, hard disks, semiconductor memories, CD-ROMs, DVDs, magneto-optical disks (MO).

(C) A transmission medium transmitting a program for executing the previously described inventive methods is also included in the present invention. Examples of this transmission medium include transmission media (optical fibers, wireless circuitry) in computer network systems (LANS, the Internet, wireless communication networks) for transmitting and providing program information as carrier waves.

(D) A server that provides a program for executing the previously described inventive methods using the foregoing transmission medium is also included in the present invention.

Utilizing the present invention notifies a user after selecting a communications partner of communication means usable by both the other party and the user. This makes it possible to select a communication means taking into account not just the other party's circumstances but also the user's own circumstances, so convenience to the user who is trying to initiate communication is increased. Further, not only communication means already present at a user terminal, but communication means that are available through downloading can be selected. In addition, wherein user have communication means at a plurality of terminals, the communication means at each terminal are administered by correlating to the users, and therefore the source user can communicate by communication means on his terminal that are most convenient for the destination user.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A communication-method notification method for use in a communications system selectively employing different application-layer communication method installed in user information terminals on a network for users to communicate with one another above the network's transport layer at the network's application layer by the different methods, the method comprising:

for each user, storing types of the application-layer communication methods operable by users' information terminals;

receiving a destination-user designation from a source user requesting communication;

based on the stored types of application-layer communication methods, generating a first list describing only application-layer communication methods that are each operable in both the destination user's information terminal and the source user's information terminal;

receiving a download condition and an execution condition regarding at least one application-layer communication method present at one, but not both, of a pair of the destination and source user's information terminals in communication with each other, and downloadable to one of the pair not having the communication method present and executable thereon;

generating a second list describing the at least one application-layer communication method; and reporting a third list composite of the first list and the second list to the source user before communication begins.

2. The communication-method notification method set forth in claim 1, wherein said second list comprises a description of a communication method not present on either the destination nor the source user's information terminal, and downloadable to both terminals and executable on both terminals.

3. The communication-method notification method set forth in claim 1, wherein:

download conditions for downloading communication methods to users' information terminals and execution conditions for executing communication methods on users' information terminals are stored in advance for each downloadable communication method; and the second list is generated based on terminal information and download conditions and execution conditions for users' information terminals.

4. The communication-method notification method set forth in claim 1, wherein:

selection of any of the communication methods on the third list is received from the source user and the selected communication method is reported to the destination user's information terminal; and if the destination user's information terminal does not have the selected communication means, the destination user's information terminal acquires the selected communication method by downloading.

5. A computer-readable recording medium whereon is recorded a program for executing the communication-method notification method set forth in the foregoing claim 1.

6. A communication-method notification system for use in a communications system selectively employing different application-layer communication methods installed in user information terminals on a network for users to communicate with one another above the network's transport layer at the network's application layer by the different methods, the system comprising:
- a first table for each user storing types of the application-layer communication methods operable by users' information terminals;
- a designation unit receiving destination-user designations from source users requesting communication;
- a communication software archive storing at least one communication application, and a download condition and an execution condition related to each communication application and defining conditions at a terminal required to respectively download and execute the communication application related thereto;
- a first generating unit generating a list, based on the types of application-layer communication methods stored in said first table, describing only application-layer communication methods that are each operable on both destination users' information terminals and source users' information terminals;
- a second generating unit referring to said communication software archive to acquire the download condition and the execution condition of at least one application-layer communication method present at one, but not both, of a pair of the destination and source user's information terminals in communication with each other, and downloadable to one of the pair not having the communication method present and executable thereon, and generating a second list describing the at least one application-layer communication method; and
- a notification unit reporting a third list composite of the first list and the second list to each source user before communication begins.

7. A communication method supply device for use in the communication-method notification system set forth in claim 6, including:
- a creation unit creating a downloadable-executable list of communication methods downloadable to information terminals and executable on the information terminals for destination users and source users respectively; and
- a supply unit supplying communication methods included in the downloadable-executable list to user information terminals.

8. The communication-method notification system set forth in claim 6, further comprising a destination notification unit notifying a destination user's information terminal of the download condition and the execution condition of a selected application-layer communication method selected from the third list when the destination user's information terminal needs to download the selected application-layer communication method.

* * * * *